(12) United States Patent
Rudolph et al.

(10) Patent No.: US 12,522,821 B2
(45) Date of Patent: Jan. 13, 2026

(54) POLYRIBONUCLEOTIDE CONTAINING DEUTERATED NUCLEOTIDES

(71) Applicant: ethris GmbH, Planegg (DE)

(72) Inventors: Carsten Rudolph, Krailling (DE); Johannes Geiger, Munich (DE); Sandra Hocke, Haimhausen (DE); Ludwig Weiss, Kissing (DE)

(73) Assignee: ethris GmbH, Planegg (DE)

( * ) Notice: Subject to any disclaimer, the term of this patent is extended or adjusted under 35 U.S.C. 154(b) by 428 days.

(21) Appl. No.: 16/969,897

(22) PCT Filed: Feb. 13, 2019

(86) PCT No.: PCT/EP2019/053546
§ 371 (c)(1),
(2) Date: Aug. 13, 2020

(87) PCT Pub. No.: WO2019/158583
PCT Pub. Date: Aug. 22, 2019

(65) Prior Publication Data
US 2021/0009995 A1    Jan. 14, 2021

(30) Foreign Application Priority Data
Feb. 13, 2018 (EP) .................................... 18156466

(51) Int. Cl.
*C12N 15/11* (2006.01)

(52) U.S. Cl.
CPC ...... *C12N 15/11* (2013.01); *C12N 2310/3531* (2013.01)

(58) Field of Classification Search
CPC .................................................. C12N 15/11
See application file for complete search history.

(56) References Cited

U.S. PATENT DOCUMENTS

2015/0119565 A1    4/2015    Srivastava

FOREIGN PATENT DOCUMENTS

WO    WO 2009/127230 A1    10/2009

OTHER PUBLICATIONS

Cromsigt et al, Preparation of partially 2 H/ 13 C-labelled RNA for NMR studies. Stereo-specific deuteration of the H5" in nucleotides, Nucleic Acid Research, 2002, vol. 30, No. 7, pp. 1639-1645 (Year: 2002).*
Hohlefelder, Luisa S., et al. "Heavy water reduces GFP expression in prokaryotic cell-free assays at the translation level while stimulating its transcription." *BioMed Research International* 2013 (2013).
Mann, L. R. B., and V. Moses. "Properties of *Escherichia coli* grown in deuterated media." *Folia Microbiologica* 16.4 (1971): 267-284.
Karikó, Katalin, et al. "Suppression of RNA recognition by Toll-like receptors: the impact of nucleoside modification and the evolutionary origin of RNA." *Immunity* 23.2 (2005): 165-175.
International Search Report for International Application No. PCT/EP2019/053546, issued May 3, 2019.

* cited by examiner

*Primary Examiner* — Ekaterina Poliakova-Georgantas
(74) *Attorney, Agent, or Firm* — Morse, Barnes-Brown & Pendleton, P.C.; Lisa M. Warren, Esq.; Erin E. Bryan, Esq.

(57) ABSTRACT

The present disclosure provides polyribonucleotides, in particular polyribonucleotides, which comprise deuterated adenosine, cytidine, guanosine, and/or uridine residues and which show reduced immunogenicity and/or enhanced expression, and methods of using such polyribonucleotides for the therapy of diseases.

16 Claims, 17 Drawing Sheets

C

A

B

POLYRIBONUCLEOTIDE CONTAINING DEUTERATED NUCLEOTIDES

RELATED APPLICATIONS

Figure 1:
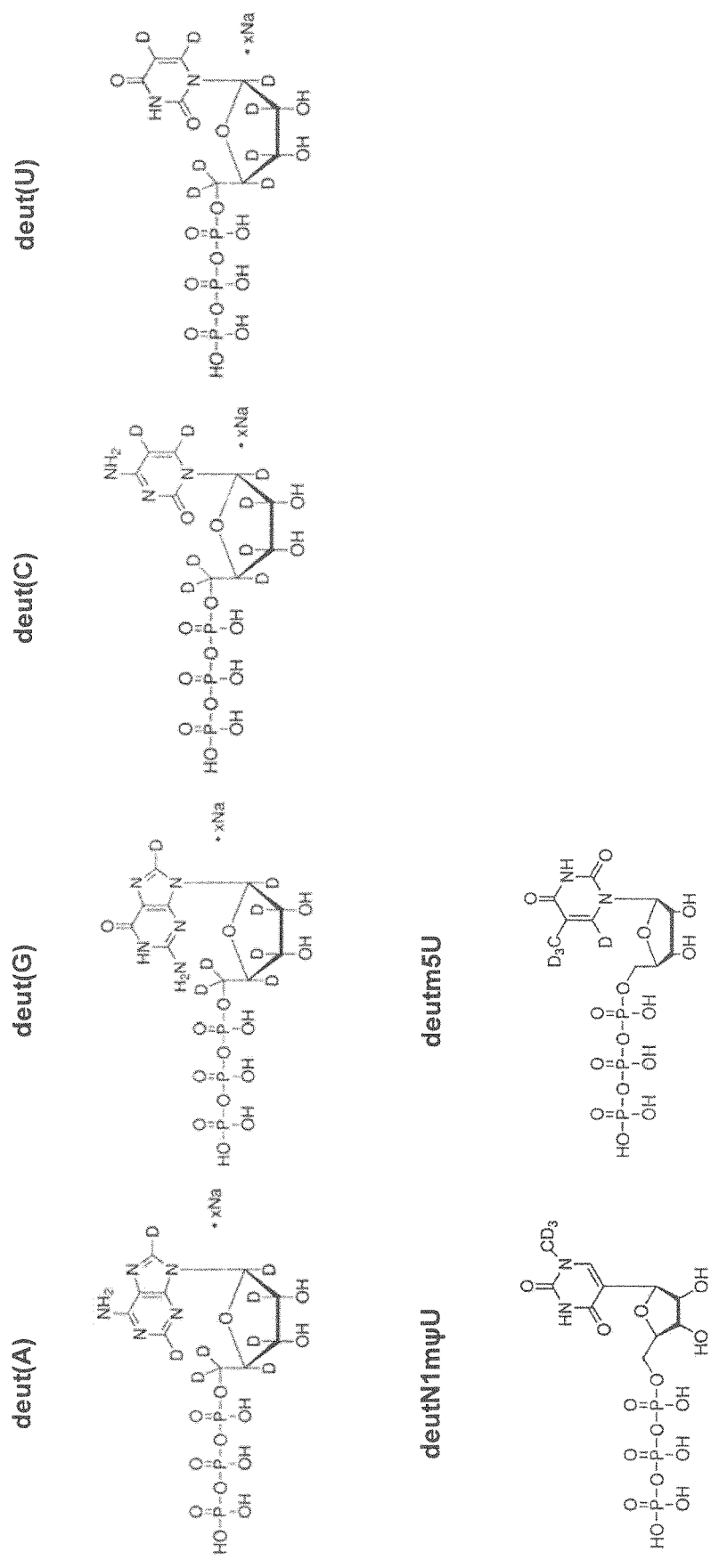

This application is a national stage filing under 35 U.S.C. 371 of International Application No. PCT/EP2019/053546, filed Feb. 13, 2019, which claims priority to European Application No. 18156466.7, filed Feb. 13, 2018. The entire teachings of the above applications are incorporated herein by reference. International Application No. PCT/EP2019/053546 was published under PCT Article 21(2) in English.

The present invention relates to a polyribonucleotide comprising a sequence which encodes a protein, wherein at least one type of nucleotide selected from the group consisting of adenosine, cytidine, guanosine and uridine is deuterated.

Genetic information is stored as deoxyribonucleic acid (DNA) in the cell nucleus and can be transcribed into ribonucleic acid (RNA) when required. Both DNA and RNA are built up of nucleotides consisting of a nitrogenous base, a five-carbon sugar, and at least one phosphate group. Different types of RNA exist including polyribonucleotides that carry the genetic information for protein synthesis. These polyribonucleotides bring the genetic information from the DNA in the cell nucleus into the cytoplasm, where it is translated into proteins. Thus, protein synthesis is mainly determined by the DNA sequence as well as the amount and the availability of the respective polyribonucleotide.

Synthesis of a desired protein in cells, for example for therapeutic purposes, can be optimized by providing the respective genetic information on DNA or RNA level. Using a polyribonucleotide comprising a sequence which encodes a protein has the advantage that it has to be introduced only into the cytoplasm of a cell where it is directly translated into protein (Tavernier et al., J Control Release, 2011, 150(3): 238-247; Yamamoto et al., Eur J Pharm Biopharm, 2009, 71(3):484-489). As polyribonucleotides do not have to be inserted into the genomic DNA in the nucleus in contrast to genetic information provided as DNA, the use of polyribonucleotides is less difficult, more efficient, and avoids the considerable risk of chromosomal DNA being altered if the vector or parts thereof become incorporated into the genome. Moreover, it could be shown that in vitro transcribed polyribonucleotides comprising a sequence which encodes a protein can in fact be expressed, i.e. translated into protein, in mammalian tissue.

Polyribonucleotides comprising a sequence which encodes a protein represent a promising tool to optimize the synthesis of a desired protein in cells, for example in therapeutic contexts, even though two main challenges persist. Polyribonucleotides trigger considerable immunological reactions and in most cases the desired protein cannot be made available in sufficient quantity due to a lack of stability.

In order to reduce an immunological reaction and to increase the translational capacity and/or the lifetime of a polyribonucleotide comprising a sequence which encodes a protein, research focused on the use of modified nucleotides. It was proposed in WO 2007/024708 to use RNA wherein one of the four ribonucleotides is replaced by a modified nucleotide. In particular, it was investigated how polyribonucleotides behave when uridine is totally replaced by pseudouridine and it was found that such an RNA molecule is significantly less immunogenic. Karikó et al. (2008, Mol Ther., 2008, 16(11):1833-40) reported that the incorporation of pseudouridine into a polyribonucleotide comprising a sequence which encodes a protein increases the translational capacity and the biological stability of the polyribonucleotide. Furthermore, it was proposed in WO 2011/012316 to use polyribonucleotides comprising a sequence which encodes a protein that include a combination of modified nucleotides, namely of modified uridines and modified cytidines in certain percentage ranges, and which show a reduced immunogenicity and at the same time a high expression level. However, there is still a need to have at hand alternative solutions for being able to deliver polyribonucleotides to organisms in vivo which do not elicit a considerable immune response and which, at the same time, have a good level of expression of the encoded protein.

The present application addresses the need for polyribonucleotides with reduced immunogenicity and enhanced expression by providing the embodiments as recited in the claims.

In particular, the present invention relates to a polyribonucleotide comprising a sequence which encodes a protein, wherein at least one type of nucleotide selected from the group consisting of adenosine, cytidine, guanosine and uridine is deuterated.

It has surprisingly been found that such polyribonucleotides show a reduced immunogenicity and a good expression level when applied in vivo for expression of a protein encoded by the polyribonucleotide in an organism.

In the context of the present invention the term "polyribonucleotide" refers to a single-stranded sequence built up of adenosine, guanosine, cytidine, and/or uridine residues, herein also referred to as the four "types of nucleotides" or "nucleotide types" if not stated otherwise. In the context of the present invention, the term "polyribonucleotide comprising a sequence which encodes a protein" refers to a polyribonucleotide which contains a coding region which encodes a sequence of amino acids. The term "protein" here encompasses any kind of amino acid sequence, i.e. chains of two or more amino acids which are each linked via peptide bonds. The term "protein" used in this context refers to any amino acid sequence of interest. Preferably, the encoded amino acid sequence is at least 5 amino acids long, more preferably at least 10 amino acids, even more preferably at least 50, 100, 200 or 500 amino acids. Thus, the term "protein" covers short peptides as well as polypeptides. The term "protein" also covers fragments of proteins, i.e. parts of known proteins, preferably functional parts. These may, for example be biologically active parts of a protein or antigenic parts such as epitopes which may be effective in raising antibodies.

As regards the function of the encoded protein, there is no limitation and possible proteins to be encoded by a polyribonucleotide of the present invention are described further below.

Preferably the term "polyribonucleotide comprising a sequence which encodes a protein" refers to an mRNA. In the context of the present invention, mRNA should be understood to mean any polyribonucleotide molecule which, if it comes into the cell, is suitable for the expression of a protein or is translatable to a protein.

The mRNA preferably contains a ribonucleotide sequence which encodes a protein whose function in the cell or in the vicinity of the cell is needed or beneficial, e.g. a protein the lack or defective form of which is a trigger for a disease or an illness, the provision of which can moderate or prevent a disease or an illness, or a protein which can promote a process which is beneficial for the body, in a cell or its vicinity. The mRNA may contain the sequence for the complete protein or a functional variant thereof. Further, the ribonucleotide sequence can encode a protein which acts as a factor, inducer, regulator, stimulator or enzyme, or a functional fragment thereof, where this protein is one whose function is necessary in order to remedy a disorder, in particular a metabolic disorder or in order to initiate processes in vivo such as the formation of new blood vessels, tissues, etc. Here, functional variant is understood to mean a fragment which in the cell can undertake the function of the protein whose function in the cell is needed or the lack or defective form whereof is pathogenic. In addition, the mRNA may also have further functional regions and/or 3' or 5' noncoding regions. The 3' and/or 5' noncoding regions can be sequences which naturally flank the encoded protein or artificial sequences which contribute to the stabilization and/or regulation of said polyribonucleotide. Suitable sequences may be identified and investigated by routine experiments. Further, said polyribonucleotide can also have further functional regions and may be combined with regulatory elements and target sequences of micro-RNAs for example for spatial and temporal control the activity of the desired polyribonucleotide comprising a sequence which encodes a protein, i.e. for example with respect to specific cells or cell types and/or developmental stages or specific time frames.

The polyribonucleotide according to the present invention may comprise a partly or fully codon optimized sequence derived from the natural sequence to be used. Codon optimization refers to a technique which is applied to maximize protein expression by increasing the translational efficiency of the respective polyribonucleotide as in some cases codons exist that are preferentially used by some species for a given amino acid. Further, said polyribonucleotide might comprise further modifications to adjust and/or extend the duration of action. Said polyribonucleotide might also contain an m7GpppG cap, an internal ribosome entry site (IRES) and/or a polyA tail at the 3' end and/or additional sequences for promoting translation.

A polyribonucleotide of the present invention is characterized in that it comprises a sequence which encodes a protein, wherein at least one type of nucleotide selected from the group consisting of adenosine, cytidine, guanosine and uridine is deuterated.

In this context, the terms adenosine, cytidine, guanosine and uridine refer to the naturally occurring nucleotides as they occur in polyribonucleotides.

In particular, the term "adenosine" refers to a nucleotide having the following chemical formula:

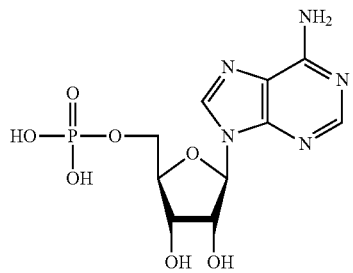

Moreover, the term "cytidine" refers to a nucleotide having the following chemical formula:

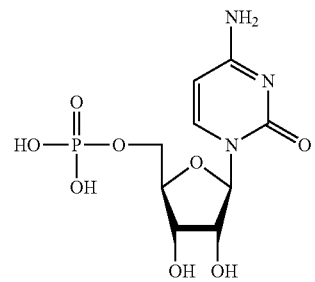

Moreover, the term "guanosine" refers to a nucleotide having the following chemical formula:

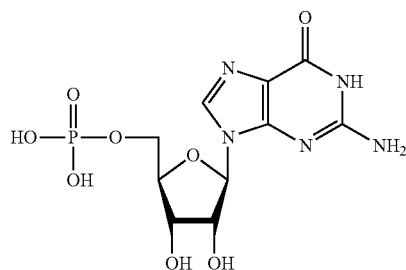

Moreover, the term "uridine" refers to a nucleotide having the following chemical formula:

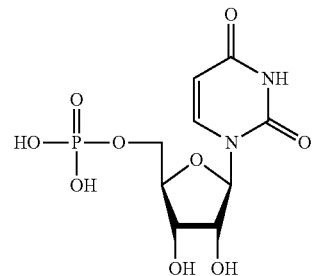

Thus, these nucleotides adenosine, cytidine, guanosine and uridine which are deuterated in a polyribonucleotide according to the present invention do not show any further modifications apart from being deuterated.

The term "is deuterated" means that in the respective nucleotide at least one of the hydrogen atoms occurring in the respective nucleotide molecule is replaced by deuterium.

Deuterium is an isotope of hydrogen. In comparison with hydrogen, deuterium has an additional neutron. It is also referred to as "hydrogen-2" or "heavy hydrogen" and is abbreviated as "D" or "$^2$H".

The deuteration of a nucleotide molecule may be partial in the sense that one or more but not all hydrogen atoms occurring in the respective nucleotide molecule is/are replaced by deuterium.

The hydrogen atom(s) which is/are replaced can be any hydrogen atom occurring in the nucleotide molecule. Thus, the hydrogen atoms which are replaced by deuterium can be the hydrogen atoms which are linked to carbon atoms in the ribose or nucleobase moieties of the nucleotide. Moreover, the hydrogen atoms which are replaced by deuterium can alternatively or in addition be the hydrogen atom of the OH group on the phosphor group, the hydrogen atoms on the OH groups on the ribose moiety and/or the hydrogen atom(s) on the amine group(s) of the nucleobase. Preferably, the hydrogen atoms which are replaced by deuterium are the hydrogen atoms which are linked to carbon atoms in the ribose or nucleobase moieties of the nucleotide. In this context, it is preferable that at least one, more preferably at least two, even more preferably at least three, at least four, at least five or at least six hydrogen atoms are replaced by deuterium.

Moreover, it is preferable that one or more, preferably all hydrogen atoms linked to carbon atoms on the ribose moiety are replaced by deuterium.

In another embodiment it is preferable that one or more, preferably all hydrogen atoms linked to carbon atoms in the nucleobase moiety are replaced by deuterium.

In a particularly preferred embodiment all hydrogen atoms in the ribose moiety and all hydrogen atoms in the nucleobase moiety which are linked to carbon atoms are replaced by deuterium.

Particularly preferred embodiments of deuterated adenosine, cytidine, guanosine and uridine nucleotides in their triphosphate forms are shown in FIG. 1.

In another embodiment, the term "deuterated" means that the nucleotide molecule is fully deuterated which means that all hydrogen atoms occurring in the nucleotide are replaced by deuterium.

As described above, it has been found that polyribonucleotides which encode a protein and in which at least one type of nucleotide selected from adenosine, cytidine, guanosine and uridine is deuterated show a reduced immunogenicity. Thus, in a preferred embodiment, the polyribonucleotide according to the present invention shows a reduced immunogenicity compared to a polyribonucleotide comprising the same sequence but without said deuterated nucleotides.

As shown by the appended Examples, it has been found that reduced immunogenicity can be achieved by deuterating at least one type of nucleotide of a polyribonucleotide comprising a sequence which encodes a protein in contrast to polyribonucleotides comprising the same sequence but without deuteration.

The administration of polyribonucleotides in their natural form to organisms, in particular mammals, is known to trigger immunogenic responses by activating the innate immune system. Immunogenicity can be determined in a manner known per se and various methods well known to those skilled in the art can be used. The immunogenic response can be measured for example based on the production of inflammatory markers, such as for example TNF-α, IFN-α, IFN-β, IL-8, IL-6, IL-12 or other cytokines known to those skilled in the art.

Methods for determining the immunogenicity of a polyribonucleotide have, for example, been described in WO 2011/012316 and the corresponding assays described in said document are preferably used in the context of the present invention for determining immunogenicity. In a preferred embodiment the immunogenicity is measured by measuring the induction of IL-6 cytokine induction. This can be achieved by methods known in the art, for example by an enzyme-linked immunosorbent assay (ELISA). Preferably, such an assay can be carried out as described in the appended Examples.

The term "reduced immunogenicity" used in accordance with the present invention means a reduced immunogenicity of the polyribonucleotide in comparison to a polyribonucleotide which shows the same sequence but which does not show deuterated nucleotides as defined above. Preferably, the term "reduced immunogenicity" means that the immunogenicity is reduced by at least 1%, 2%, 3%, 4%, or 5%, preferably by at least 10%, more preferably by at least 25%, even more preferably by at least 50%, most preferably by at least 75%.

As described above, it has been found that polyribonucleotides which encode a protein and in which at least one type of nucleotide selected from adenosine, cytidine, guanosine and uridine is deuterated may also show an increased expression. Thus, in a preferred embodiment, the polyribonucleotide according to the present invention shows an enhanced expression compared to a polyribonucleotide comprising the same sequence but without said deuterated nucleotides.

As demonstrated by the Examples, replacing hydrogen with deuterium in polyribonucleotides according to the invention may result in an enhanced expression of the encoded protein compared to polyribonucleotides comprising the same sequence but without deuterated nucleotides.

The term "expression" in this context means the production of the protein encoded by the polyribonucleotide according to the present invention. The expression can be measured by methods known to the person skilled in the art. One possibility is, e.g., to determine the amount of the protein produced, e.g. by immunological assays such as ELISA or the like. For such assays antibodies against the respective protein can be employed and quantification can be achieved by methods known to the person skilled in the art.

Expression can also be measured by measuring the resulting amount of polypeptide being translated from the polyribonucleotide by well-known assays or by measuring the activity of the expressed protein. For example, if the expressed protein is an enzyme, the level of expression can be measured by measuring the enzymatic activity in corresponding assays. Similarly, also other biological activities of the encoded protein can be measured thereby allowing to determine the level of expression of the respective protein.

The term "enhanced expression" used herein means an enhanced expression of the polyribonucleotide in comparison to a polyribonucleotide which shows the same sequence but which does not show deuterated nucleotides as defined above. Preferably, the term "enhanced expression" means that the expression is enhanced by at least 1%, 2%, 3%, 4%, or 5%, preferably by at least 10%, more preferably by at least 25%, even more preferably by at least 50%, particularly preferred by at least 75%, most preferably by at least 100%. The term "enhanced expression" can be due to a higher expression of the deuterated polyribonucleotide when measured over a certain period of time in comparison to a polyribonucleotide having the same sequence but not containing deuterated nucleotides. The term "enhanced expression" can also be due to a higher stability of the deuterated polyribonucleotide thereby leading to a longer lifetime and accordingly higher expression when compared to a polyribonucleotide which shows the same sequence but which does not show deuterated nucleotides.

The polyribonucleotide according to the invention can be made in any manner known to one of ordinary skill in the art. The use of deuterium is well-established in analytical tools for determining protein structures, like nuclear magnetic resonance (NMR) spectroscopy and electrospray ionization mass spectrometry (MS), as deuteration reduces the signal-to-noise ratio in NMR and mass spectra (Sattler and Fesik, Structure, 1996, 4(11):1245-9; Yan et al., Mol Cell Proteomics, 3(19):1039-1041). Various approaches have been developed for the deuteration including deuteration of specific positions in a protein or nucleotide sequence and random fractional deuteration. The synthesis of deuterated single nucleotides and polynucleotides has also been described in the literature in this context (Tolbert and Williamson, J Am Chem Soc, 1996, 118(34):7929-7940; Chen et al., Bioorganic Med Chem Lett, 2002, 12(21):3093-3096). Furthermore, U.S. Pat. No. 9,512,162 and WO 2014/022566 disclose the synthesis of deuterated polyribonucleotides.

In a preferred embodiment, the polyribonucleotide of the present invention is an isolated polyribonucleotide. The term "isolated" in this context means that it is a polyribonucleotide which is present in a cell-free environment, i.e. is not present in a cell Preferably it is present in solution or in lyophilized form, more preferably in the form of a pharmaceutically acceptable formulation.

In a preferred embodiment, the polyribonucleotide is the product of an in vitro transcription reaction in the presence of one or more deuterated nucleotide(s).

A polyribonucleotide according to the invention can typically be obtained by using for the production thereof a nucleotide mixture which contains nucleotides (preferably in the triphosphate form) of which at least one type is deuterated. As will be described further below, the polyribonucleotide can contain various percentages of deuterated nucleotides of a given type (e.g., not all adenosine residues have to be deuterated but only a certain percentage of all adenosine residues in the polyribonucleotide). Accordingly, the nucleotide mixture used for the production of the polyribonucleotide in such a situation also only contains said respective percentage of the corresponding deuterated nucleotide.

A polyribonucleotide according to the present invention can, e.g., be synthesized synthetically or recombinantly by methods known to the person skilled in the art. These include for example the production of said polyribonucleotides by chemical synthesis or in vitro transcription in the presence of adenosine-5'-triphosphat, cytidine-5'-triphosphat, guanosine-5'-triphosphat, and/or uridine-5'-triphosphat, wherein at least one of these nucleotides is deuterated as described above. Templates for transcription can, e.g., be provided by PCR, chemical synthesis or cloning DNA encoding the polyribonucleotide into a suitable vector or the like. Polyribonucleotides according to the present invention can also be synthesized in vivo, e.g. by cultivating cells of a microorganism such as *Escherichia coli* in the presence of deuterium oxide which partially or fully replaces water. The cells can also be genetically modified to recombinantly express the desired polyribonucleotide and/or to optimize its expression.

The polyribonucleotide according to the present invention can contain different amounts of deuterated nucleotides. In particular, the term "wherein at least one type of nucleotide selected from the group consisting of adenosine, cytidine, guanosine and uridine is deuterated" means that at least a certain percentage of the respective nucleotide or nucleotides occurring in the polyribonucleotide is deuterated. Thus, at least 1%, 5%, 10%, 15%, 20%, 25%, 30%, 35%, 40%, 45%, 50%, 55%, 60%, 65%, 70%, 75%, 80%, 85%, 90%, 95%, preferably 100% of the molecules of a certain nucleotide type occurring in the polyribonucleotide are deuterated. This means, e.g., that if a polyribonucleotide of the present invention contains deuterated adenosine, the amount of deuterated adenosine residues in the polyribonucleotide may be at least 1%, 5%, 10%, 15%, 20%, 25%, 30%, 35%, 40%, 45%, 50%, 55%, 60%, 65%, 70%, 75%, 80%, 85%, 90%, 95%, preferably 100% of all adenosine residues occurring in the polyribonucleotide.

Similarly, if a polyribonucleotide of the present invention contains deuterated cytidine, the amount of deuterated cytidine residues in the polyribonucleotide may be at least 1%, 5%, 10%, 15%, 20%, 25%, 30%, 35%, 40%, 45%, 50%, 55%, 60%, 65%, 70%, 75%, 80%, 85%, 90%, 95%, preferably 100% of all cytidine residues occurring in the polyribonucleotide.

In the same manner, if a polyribonucleotide of the present invention contains deuterated guanosine, the amount of deuterated guanosine residues in the polyribonucleotide may be at least 1%, 5%, 10%, 15%, 20%, 25%, 30%, 35%, 40%, 45%, 50%, 55%, 60%, 65%, 70%, 75%, 80%, 85%, 90%, 95%, preferably 100% of all guanosine residues occurring in the polyribonucleotide.

And if a polyribonucleotide of the present invention contains deuterated uridine, the amount of deuterated uridine residues in the polyribonucleotide may be at least 1%, 5%, 10%, 15%, 20%, 25%, 30%, 35%, 40%, 45%, 50%, 55%, 60%, 65%, 70%, 75%, 80%, 85%, 90%, 95%, preferably 100% of all uridine residues occurring in the polyribonucleotide.

Preferably up to 25%, even more preferably up to 50%, even more preferably up to 75%, and most preferably up to 100% of the nucleotides of a given nucleotide type are deuterated.

If in a polyribonucleotide according to the present invention more than one type of nucleotide type is deuterated, the above indicated percentage values can be used in any possible combination. Thus, it is e.g. possible that in a polyribonucleotide according to the present invention at least 50% of the adenosine residues are deuterated while at least 25% of the guanosine residues are deuterated.

This is illustrated in the following by providing a non-limiting number of embodiments of the present invention using the abbreviations listed in Table 1. Values that are expressed as ranges can assume any subrange within the stated range or any specific value including endpoints unless indicated otherwise.

TABLE 1

| Abbreviation | Percentage of deuterated nucleotides |
| --- | --- |
| — | 0% |
| a | 0% < deuterated % ≤ 25% |
| b | 25% < deuterated % ≤ 50% |
| c | 50% < deuterated % ≤ 75% |
| d | 75% < deuterated % < 100% |
| D | 100% |

In some embodiments the polynucleotide according to the present invention contains deuterated uridine residues.

In some embodiments the polynucleotide according to the present invention contains deuterated uridine residues and deuterated guanosine residues.

In some embodiments the polynucleotide according to the present invention contains deuterated uridine residues and deuterated cytidine residues.

In some embodiments the polynucleotide according to the present invention contains deuterated uridine residues and deuterated adenosine residues.

In some embodiments the polynucleotide according to the present invention contains deuterated uridine residues and deuterated guanosine residues and deuterated cytidine residues.

In some embodiments the polynucleotide according to the present invention contains deuterated uridine residues and deuterated guanosine residues and deuterated adenosine residues.

In some embodiments the polynucleotide according to the present invention contains deuterated uridine residues and deuterated cytidine residues and deuterated adenosine residues.

In some embodiments the polynucleotide according to the present invention contains deuterated uridine residues and deuterated guanosine residues and deuterated adenosine residues and deuterated cytidine residues.

In some embodiments the polynucleotide according to the present invention contains deuterated guanosine residues.

In some embodiments the polynucleotide according to the present invention contains deuterated guanosine residues and deuterated cytidine residues.

In some embodiments the polynucleotide according to the present invention contains deuterated guanosine residues and deuterated adenosine residues.

In some embodiments the polynucleotide according to the present invention contains deuterated guanosine residues and deuterated adenosine residues and deuterated cytidine residues.

In some embodiments the polynucleotide according to the present invention contains deuterated cytidine residues.

In some embodiments the polynucleotide according to the present invention contains deuterated cytidine residues and deuterated adenosine residues.

In some embodiments the polynucleotide according to the present invention contains deuterated adenosine residues.

Preferably, at least 25% of the nucleotides of each of said nucleotide type are deuterated, more preferably at least 50%, even more preferably at least 75%, most preferably all respective nucleotides. The following Tables provided examples of possible combinations of deuterated (or not deuterated) nucleotide types present in a polynucleotide according to the present invention.

Table 2 exemplarily shows percentages for deuterated adenosine residues (A) or deuterated guanosine residues (G) or deuterated cytidine residues (C) or deuterated uridine residues (U) present in a polynucleotide according to the present invention using the abbreviations set forth in Table 1.

TABLE 2

|   | A | C | G | U |
|---|---|---|---|---|
| A | a | — | — | — |
|   | b | — | — | — |
|   | c | — | — | — |
|   | d | — | — | — |
|   | D | — | — | — |
| C | — | a | — | — |
|   | — | b | — | — |
|   | — | c | — | — |
|   | — | d | — | — |
|   | — | D | — | — |
| G | — | — | a | — |
|   | — | — | b | — |
|   | — | — | c | — |
|   | — | — | d | — |
|   | — | — | D | — |
| U | — | — | — | a |
|   | — | — | — | b |
|   | — | — | — | c |
|   | — | — | — | d |
|   | — | — | — | D |

As indicated above, in some embodiments, at least two types of nucleotides selected from the group consisting of adenosine (A), cytidine (C), guanosine (G), and uridine (U) are deuterated, wherein preferably adenosine and guanosine residues or cytidine and uridine residues are deuterated, as shown exemplarily in Table 3. Preferably, at least 25% of the nucleotides of each of said at least two types of nucleotide types are deuterated, more preferably at least 50%, even more preferably at least 75%, most preferably all respective nucleotides.

TABLE 3

|      | A | C | G | U |
|------|---|---|---|---|
| A, C | a | a | — | — |
|      | a | b | — | — |
|      | a | c | — | — |
|      | a | d | — | — |
|      | a | D | — | — |
|      | b | a | — | — |
|      | b | b | — | — |
|      | b | c | — | — |
|      | b | d | — | — |
|      | b | D | — | — |
|      | c | a | — | — |
|      | c | b | — | — |
|      | c | c | — | — |
|      | c | d | — | — |
|      | c | D | — | — |
|      | d | a | — | — |
|      | d | b | — | — |
|      | d | c | — | — |
|      | d | d | — | — |
|      | d | D | — | — |
|      | D | a | — | — |
|      | D | b | — | — |
|      | D | c | — | — |
|      | D | d | — | — |
|      | D | D | — | — |
| A, G | a | — | a | — |
|      | a | — | b | — |
|      | a | — | c | — |
|      | a | — | d | — |
|      | a | — | D | — |
|      | b | — | a | — |
|      | b | — | b | — |
|      | b | — | c | — |
|      | b | — | d | — |
|      | b | — | D | — |
|      | c | — | a | — |
|      | c | — | b | — |
|      | c | — | c | — |
|      | c | — | d | — |
|      | c | — | D | — |
|      | d | — | a | — |
|      | d | — | b | — |
|      | d | — | c | — |
|      | d | — | d | — |
|      | d | — | D | — |
|      | D | — | a | — |
|      | D | — | b | — |
|      | D | — | c | — |
|      | D | — | d | — |
|      | D | — | D | — |
| A, U | a | — | — | a |
|      | a | — | — | b |
|      | a | — | — | c |
|      | a | — | — | d |
|      | a | — | — | D |
|      | b | — | — | a |
|      | b | — | — | b |
|      | b | — | — | c |
|      | b | — | — | d |
|      | b | — | — | D |
|      | c | — | — | a |
|      | c | — | — | b |
|      | c | — | — | c |
|      | c | — | — | d |

TABLE 3-continued

| | A | C | G | U |
|---|---|---|---|---|
| | c | — | — | D |
| | d | — | — | a |
| | d | — | — | b |
| | d | — | — | c |
| | d | — | — | d |
| | d | — | — | D |
| | D | — | — | a |
| | D | — | — | b |
| | D | — | — | c |
| | D | — | — | d |
| | D | — | — | D |
| C, G | — | a | a | — |
| | — | a | b | — |
| | — | a | c | — |
| | — | a | d | — |
| | — | a | D | — |
| | — | b | a | — |
| | — | b | b | — |
| | — | b | c | — |
| | — | b | d | — |
| | — | b | D | — |
| | — | c | a | — |
| | — | c | b | — |
| | — | c | c | — |
| | — | c | d | — |
| | — | c | D | — |
| | — | d | a | — |
| | — | d | b | — |
| | — | d | c | — |
| | — | d | d | — |
| | — | d | D | — |
| | — | D | a | — |
| | — | D | b | — |
| | — | D | c | — |
| | — | D | d | — |
| | — | D | D | — |
| C, U | — | a | — | a |
| | — | a | — | b |
| | — | a | — | c |
| | — | a | — | d |
| | — | a | — | D |
| | — | b | — | a |
| | — | b | — | b |
| | — | b | — | c |
| | — | b | — | d |
| | — | b | — | D |
| | — | c | — | a |
| | — | c | — | b |
| | — | c | — | c |
| | — | c | — | d |
| | — | c | — | D |
| | — | d | — | a |
| | — | d | — | b |
| | — | d | — | c |
| | — | d | — | d |
| | — | d | — | D |
| | — | D | — | a |
| | — | D | — | b |
| | — | D | — | c |
| | — | D | — | d |
| | — | D | — | D |
| G, U | — | — | a | a |
| | — | — | a | b |
| | — | — | a | c |
| | — | — | a | d |
| | — | — | a | D |
| | — | — | b | a |
| | — | — | b | b |
| | — | — | b | c |
| | — | — | b | d |
| | — | — | b | D |
| | — | — | c | a |
| | — | — | c | b |
| | — | — | c | c |
| | — | — | c | d |
| | — | — | c | D |
| | — | — | d | a |
| | — | — | d | b |
| | — | — | d | c |
| | — | — | d | d |
| | — | — | d | D |
| | — | — | D | a |
| | — | — | D | b |
| | — | — | D | c |
| | — | — | D | d |
| | — | — | D | D |

More preferably, at least three types of nucleotides selected from the group consisting of adenosine (A), cytidine (C), guanosine (G) and uridine (U) are deuterated as shown exemplarily in Table 4. Preferably, at least 25% of the nucleotides of each of said at least three types of nucleotide types are deuterated, more preferably at least 50%, even more preferably at least 75%, most preferably all respective nucleotides.

TABLE 4

| | A | C | G | U |
|---|---|---|---|---|
| A, C, G | a | a | a | — |
| | a | a | b | — |
| | a | a | c | — |
| | a | a | d | — |
| | a | a | D | — |
| | a | b | a | — |
| | a | b | b | — |
| | a | b | c | — |
| | a | b | d | — |
| | a | b | D | — |
| | a | c | a | — |
| | a | c | b | — |
| | a | c | c | — |
| | a | c | d | — |
| | a | c | D | — |
| | a | d | a | — |
| | a | d | b | — |
| | a | d | c | — |
| | a | d | d | — |
| | a | d | D | — |
| | a | D | a | — |
| | a | D | b | — |
| | a | D | c | — |
| | a | D | d | — |
| | a | D | D | — |
| | b | a | a | — |
| | b | a | b | — |
| | b | a | c | — |
| | b | a | d | — |
| | b | a | D | — |
| | b | b | a | — |
| | b | b | b | — |
| | b | b | c | — |
| | b | b | d | — |
| | b | b | D | — |
| | b | c | a | — |
| | b | c | b | — |
| | b | c | c | — |
| | b | c | d | — |
| | b | c | D | — |
| | b | d | a | — |
| | b | d | b | — |
| | b | d | c | — |
| | b | d | d | — |
| | b | d | D | — |
| | b | D | a | — |
| | b | D | b | — |
| | b | D | c | — |
| | b | D | d | — |
| | b | D | D | — |
| | c | a | a | — |
| | c | a | b | — |
| | c | a | c | — |

TABLE 4-continued

| | A | C | G | U |
|---|---|---|---|---|
| | c | a | d | — |
| | c | a | D | — |
| | c | b | a | — |
| | c | b | b | — |
| | c | b | c | — |
| | c | b | d | — |
| | c | b | D | — |
| | c | c | a | — |
| | c | c | b | — |
| | c | c | c | — |
| | c | c | d | — |
| | c | c | D | — |
| | c | d | a | — |
| | c | d | b | — |
| | c | d | c | — |
| | c | d | d | — |
| | c | d | D | — |
| | c | D | a | — |
| | c | D | b | — |
| | c | D | c | — |
| | c | D | d | — |
| | c | D | D | — |
| | d | a | a | — |
| | d | a | b | — |
| | d | a | c | — |
| | d | a | d | — |
| | d | a | D | — |
| | d | b | a | — |
| | d | b | b | — |
| | d | b | c | — |
| | d | b | d | — |
| | d | b | D | — |
| | d | c | a | — |
| | d | c | b | — |
| | d | c | c | — |
| | d | c | d | — |
| | d | c | D | — |
| | d | d | a | — |
| | d | d | b | — |
| | d | d | c | — |
| | d | d | d | — |
| | d | d | D | — |
| | d | D | a | — |
| | d | D | b | — |
| | d | D | c | — |
| | d | D | d | — |
| | d | D | D | — |
| | D | a | a | — |
| | D | a | b | — |
| | D | a | c | — |
| | D | a | d | — |
| | D | a | D | — |
| | D | b | a | — |
| | D | b | b | — |
| | D | b | c | — |
| | D | b | d | — |
| | D | b | D | — |
| | D | c | a | — |
| | D | c | b | — |
| | D | c | c | — |
| | D | c | d | — |
| | D | c | D | — |
| | D | d | a | — |
| | D | d | b | — |
| | D | d | c | — |
| | D | d | d | — |
| | D | d | D | — |
| | D | D | a | — |
| | D | D | b | — |
| | D | D | c | — |
| | D | D | d | — |
| | D | D | D | — |
| A, C, U | a | a | — | a |
| | a | a | — | b |
| | a | a | — | c |
| | a | a | — | d |
| | a | a | — | D |
| | a | b | — | a |
| | a | b | — | b |
| | a | b | — | c |
| | a | b | — | d |
| | a | b | — | D |
| | a | c | — | a |
| | a | c | — | b |
| | a | c | — | c |
| | a | c | — | d |
| | a | c | — | D |
| | a | d | — | a |
| | a | d | — | b |
| | a | d | — | c |
| | a | d | — | d |
| | a | d | — | D |
| | a | D | — | a |
| | a | D | — | b |
| | a | D | — | c |
| | a | D | — | d |
| | a | D | — | D |
| | b | a | — | a |
| | b | a | — | b |
| | b | a | — | c |
| | b | a | — | d |
| | b | a | — | D |
| | b | b | — | a |
| | b | b | — | b |
| | b | b | — | c |
| | b | b | — | d |
| | b | b | — | D |
| | b | c | — | a |
| | b | c | — | b |
| | b | c | — | c |
| | b | c | — | d |
| | b | c | — | D |
| | b | d | — | a |
| | b | d | — | b |
| | b | d | — | c |
| | b | d | — | d |
| | b | d | — | D |
| | b | D | — | a |
| | b | D | — | b |
| | b | D | — | c |
| | b | D | — | d |
| | b | D | — | D |
| | c | a | — | a |
| | c | a | — | b |
| | c | a | — | c |
| | c | a | — | d |
| | c | a | — | D |
| | c | b | — | a |
| | c | b | — | b |
| | c | b | — | c |
| | c | b | — | d |
| | c | b | — | D |
| | c | c | — | a |
| | c | c | — | b |
| | c | c | — | c |
| | c | c | — | d |
| | c | c | — | D |
| | c | d | — | a |
| | c | d | — | b |
| | c | d | — | c |
| | c | d | — | d |
| | c | d | — | D |
| | c | D | — | a |
| | c | D | — | b |
| | c | D | — | c |
| | c | D | — | d |
| | c | D | — | D |
| | d | a | — | a |
| | d | a | — | b |
| | d | a | — | c |
| | d | a | — | d |
| | d | a | — | D |
| | d | b | — | a |
| | d | b | — | b |
| | d | b | — | c |
| | d | b | — | d |

TABLE 4-continued

| A | C | G | U |
|---|---|---|---|
| d | b | — | D |
| d | c | — | a |
| d | c | — | b |
| d | c | — | c |
| d | c | — | d |
| d | c | — | D |
| d | d | — | a |
| d | d | — | b |
| d | d | — | c |
| d | d | — | d |
| d | d | — | D |
| d | D | — | a |
| d | D | — | b |
| d | D | — | c |
| d | D | — | d |
| d | D | — | D |
| D | a | — | a |
| D | a | — | b |
| D | a | — | c |
| D | a | — | d |
| D | a | — | D |
| D | b | — | a |
| D | b | — | b |
| D | b | — | c |
| D | b | — | d |
| D | b | — | D |
| D | c | — | a |
| D | c | — | b |
| D | c | — | c |
| D | c | — | d |
| D | c | — | D |
| D | d | — | a |
| D | d | — | b |
| D | d | — | c |
| D | d | — | d |
| D | d | — | D |
| D | D | — | a |
| D | D | — | b |
| D | D | — | c |
| D | D | — | d |
| D | D | — | D |
| A, G, U | | | |
| a | — | a | a |
| a | — | a | b |
| a | — | a | c |
| a | — | a | d |
| a | — | a | D |
| a | — | b | a |
| a | — | b | b |
| a | — | b | c |
| a | — | b | d |
| a | — | b | D |
| a | — | c | a |
| a | — | c | b |
| a | — | c | c |
| a | — | c | d |
| a | — | c | D |
| a | — | d | a |
| a | — | d | b |
| a | — | d | c |
| a | — | d | d |
| a | — | d | D |
| a | — | D | a |
| a | — | D | b |
| a | — | D | c |
| a | — | D | d |
| a | — | D | D |
| b | — | a | a |
| b | — | a | b |
| b | — | a | c |
| b | — | a | d |
| b | — | a | D |
| b | — | b | a |
| b | — | b | b |
| b | — | b | c |
| b | — | b | d |
| b | — | b | D |
| b | — | c | a |
| b | — | c | b |
| b | — | c | c |
| b | — | c | d |
| b | — | c | D |
| b | — | d | a |
| b | — | d | b |
| b | — | d | c |
| b | — | d | d |
| b | — | d | D |
| b | — | D | a |
| b | — | D | b |
| b | — | D | c |
| b | — | D | D |
| c | — | a | a |
| c | — | a | b |
| c | — | a | c |
| c | — | a | d |
| c | — | a | D |
| c | — | b | a |
| c | — | b | b |
| c | — | b | c |
| c | — | b | d |
| c | — | b | D |
| c | — | c | a |
| c | — | c | b |
| c | — | c | c |
| c | — | c | d |
| c | — | c | D |
| c | — | d | a |
| c | — | d | b |
| c | — | d | c |
| c | — | d | d |
| c | — | d | D |
| c | — | D | a |
| c | — | D | b |
| c | — | D | c |
| c | — | D | d |
| c | — | D | D |
| d | — | a | a |
| d | — | a | b |
| d | — | a | c |
| d | — | a | d |
| d | — | a | D |
| d | — | b | a |
| d | — | b | b |
| d | — | b | c |
| d | — | b | d |
| d | — | b | D |
| d | — | c | a |
| d | — | c | b |
| d | — | c | c |
| d | — | c | d |
| d | — | c | D |
| d | — | d | a |
| d | — | d | b |
| d | — | d | c |
| d | — | d | d |
| d | — | d | D |
| d | — | D | a |
| d | — | D | b |
| d | — | D | c |
| d | — | D | d |
| d | — | D | D |
| D | — | a | a |
| D | — | a | b |
| D | — | a | c |
| D | — | a | d |
| D | — | a | D |
| D | — | b | a |
| D | — | b | b |
| D | — | b | c |
| D | — | b | d |
| D | — | b | D |
| D | — | c | a |
| D | — | c | b |
| D | — | c | c |
| D | — | c | d |
| D | — | c | D |

TABLE 4-continued

| | A | C | G | U |
|---|---|---|---|---|
| | D | — | d | a |
| | D | — | d | b |
| | D | — | d | c |
| | D | — | d | d |
| | D | — | d | D |
| | D | — | D | a |
| | D | — | D | b |
| | D | — | D | c |
| | D | — | D | d |
| | D | — | D | D |
| C, G, U | — | a | a | a |
| | — | a | a | b |
| | — | a | a | c |
| | — | a | a | d |
| | — | a | a | D |
| | — | a | b | a |
| | — | a | b | b |
| | — | a | b | c |
| | — | a | b | d |
| | — | a | b | D |
| | — | a | c | a |
| | — | a | c | b |
| | — | a | c | c |
| | — | a | c | d |
| | — | a | c | D |
| | — | a | d | a |
| | — | a | d | b |
| | — | a | d | c |
| | — | a | d | d |
| | — | a | d | D |
| | — | a | D | a |
| | — | a | D | b |
| | — | a | D | c |
| | — | a | D | d |
| | — | a | D | D |
| | — | b | a | a |
| | — | b | a | b |
| | — | b | a | c |
| | — | b | a | d |
| | — | b | a | D |
| | — | b | b | a |
| | — | b | b | b |
| | — | b | b | c |
| | — | b | b | d |
| | — | b | b | D |
| | — | b | c | a |
| | — | b | c | b |
| | — | b | c | c |
| | — | b | c | d |
| | — | b | c | D |
| | — | b | d | a |
| | — | b | d | b |
| | — | b | d | c |
| | — | b | d | d |
| | — | b | d | D |
| | — | b | D | a |
| | — | b | D | b |
| | — | b | D | c |
| | — | b | D | d |
| | — | b | D | D |
| | — | c | a | a |
| | — | c | a | b |
| | — | c | a | c |
| | — | c | a | d |
| | — | c | a | D |
| | — | c | b | a |
| | — | c | b | b |
| | — | c | b | c |
| | — | c | b | d |
| | — | c | b | D |
| | — | c | c | a |
| | — | c | c | b |
| | — | c | c | c |
| | — | c | c | d |
| | — | c | c | D |
| | — | c | d | a |
| | — | c | d | b |
| | — | c | d | c |
| | — | c | d | d |
| | — | c | d | D |
| | — | c | D | a |
| | — | c | D | b |
| | — | c | D | c |
| | — | c | D | d |
| | — | c | D | D |
| | — | d | a | a |
| | — | d | a | b |
| | — | d | a | c |
| | — | d | a | d |
| | — | d | a | D |
| | — | d | b | a |
| | — | d | b | b |
| | — | d | b | c |
| | — | d | b | d |
| | — | d | b | D |
| | — | d | c | a |
| | — | d | c | b |
| | — | d | c | c |
| | — | d | c | d |
| | — | d | c | D |
| | — | d | d | a |
| | — | d | d | b |
| | — | d | d | c |
| | — | d | d | d |
| | — | d | d | D |
| | — | d | D | a |
| | — | d | D | b |
| | — | d | D | c |
| | — | d | D | d |
| | — | d | D | D |
| | — | D | a | a |
| | — | D | a | b |
| | — | D | a | c |
| | — | D | a | d |
| | — | D | a | D |
| | — | D | b | a |
| | — | D | b | b |
| | — | D | b | c |
| | — | D | b | d |
| | — | D | b | D |
| | — | D | c | a |
| | — | D | c | b |
| | — | D | c | c |
| | — | D | c | d |
| | — | D | c | D |
| | — | D | d | a |
| | — | D | d | b |
| | — | D | d | c |
| | — | D | d | d |
| | — | D | d | D |
| | — | D | D | a |
| | — | D | D | b |
| | — | D | D | c |
| | — | D | D | d |
| | — | D | D | D |

In another embodiment all four types of nucleotides selected from the group consisting of adenosine (A), cytidine (C), guanosine (G) and uridine (U) are deuterated as shown exemplarily in Table 5. Preferably, at least 25% of the nucleotides of each of said four types of nucleotide types are deuterated, more preferably at least 50%, even more preferably at least 75%, most preferably all respective nucleotides.

TABLE 5

| | A | C | G | U |
|---|---|---|---|---|
| A, C, G, U | a | a | a | a |
| | a | a | a | b |
| | a | a | a | c |
| | a | a | a | d |

TABLE 5-continued

| A | C | G | U |
|---|---|---|---|
| a | a | a | D |
| a | a | b | a |
| a | a | b | b |
| a | a | b | c |
| a | a | b | d |
| a | a | b | D |
| a | a | c | a |
| a | a | c | b |
| a | a | c | c |
| a | a | c | d |
| a | a | c | D |
| a | a | d | a |
| a | a | d | b |
| a | a | d | c |
| a | a | d | d |
| a | a | d | D |
| a | a | D | a |
| a | a | D | b |
| a | a | D | c |
| a | a | D | d |
| a | a | D | D |
| a | b | a | a |
| a | b | a | b |
| a | b | a | c |
| a | b | a | d |
| a | b | a | D |
| a | b | b | a |
| a | b | b | b |
| a | b | b | c |
| a | b | b | d |
| a | b | b | D |
| a | b | c | a |
| a | b | c | b |
| a | b | c | c |
| a | b | c | d |
| a | b | c | D |
| a | b | d | a |
| a | b | d | b |
| a | b | d | c |
| a | b | d | d |
| a | b | d | D |
| a | b | D | a |
| a | b | D | b |
| a | b | D | c |
| a | b | D | d |
| a | b | D | D |
| a | c | a | a |
| a | c | a | b |
| a | c | a | c |
| a | c | a | d |
| a | c | a | D |
| a | c | b | a |
| a | c | b | b |
| a | c | b | c |
| a | c | b | d |
| a | c | b | D |
| a | c | c | a |
| a | c | c | b |
| a | c | c | c |
| a | c | c | d |
| a | c | c | D |
| a | c | d | a |
| a | c | d | b |
| a | c | d | c |
| a | c | d | d |
| a | c | d | D |
| a | c | D | a |
| a | c | D | b |
| a | c | D | c |
| a | c | D | d |
| a | c | D | D |
| a | d | a | a |
| a | d | a | b |
| a | d | a | c |
| a | d | a | d |
| a | d | a | D |
| a | d | b | a |
| a | d | b | b |
| a | d | b | c |
| a | d | b | d |
| a | d | b | D |
| a | d | c | a |
| a | d | c | b |
| a | d | c | c |
| a | d | c | d |
| a | d | c | D |
| a | d | d | a |
| a | d | d | b |
| a | d | d | c |
| a | d | d | d |
| a | d | d | D |
| a | d | D | a |
| a | d | D | b |
| a | d | D | c |
| a | d | D | d |
| a | d | D | D |
| a | D | a | a |
| a | D | a | b |
| a | D | a | c |
| a | D | a | d |
| a | D | a | D |
| a | D | b | a |
| a | D | b | b |
| a | D | b | c |
| a | D | b | d |
| a | D | b | D |
| a | D | c | a |
| a | D | c | b |
| a | D | c | c |
| a | D | c | d |
| a | D | c | D |
| a | D | d | a |
| a | D | d | b |
| a | D | d | c |
| a | D | d | d |
| a | D | d | D |
| a | D | D | a |
| a | D | D | b |
| a | D | D | c |
| a | D | D | d |
| a | D | D | D |
| b | a | a | a |
| b | a | a | b |
| b | a | a | c |
| b | a | a | d |
| b | a | a | D |
| b | a | b | a |
| b | a | b | b |
| b | a | b | c |
| b | a | b | d |
| b | a | b | D |
| b | a | c | a |
| b | a | c | b |
| b | a | c | c |
| b | a | c | d |
| b | a | c | D |
| b | a | d | a |
| b | a | d | b |
| b | a | d | c |
| b | a | d | d |
| b | a | d | D |
| b | a | D | a |
| b | a | D | b |
| b | a | D | c |
| b | a | D | d |
| b | a | D | D |
| b | b | a | a |
| b | b | a | b |
| b | b | a | c |
| b | b | a | d |
| b | b | a | D |
| b | b | b | a |
| b | b | b | b |
| b | b | b | c |
| b | b | b | d |
| b | b | b | D |

TABLE 5-continued

| A | C | G | U |
|---|---|---|---|
| b | b | c | a |
| b | b | c | b |
| b | b | c | c |
| b | b | c | d |
| b | b | c | D |
| b | b | d | a |
| b | b | d | b |
| b | b | d | c |
| b | b | d | d |
| b | b | d | D |
| b | b | D | a |
| b | b | D | b |
| b | b | D | c |
| b | b | D | d |
| b | b | D | D |
| b | c | a | a |
| b | c | a | b |
| b | c | a | c |
| b | c | a | d |
| b | c | a | D |
| b | c | b | a |
| b | c | b | b |
| b | c | b | c |
| b | c | b | d |
| b | c | b | D |
| b | c | c | a |
| b | c | c | b |
| b | c | c | c |
| b | c | c | d |
| b | c | c | D |
| b | c | d | a |
| b | c | d | b |
| b | c | d | c |
| b | c | d | d |
| b | c | d | D |
| b | c | D | a |
| b | c | D | b |
| b | c | D | c |
| b | c | D | d |
| b | c | D | D |
| b | d | a | a |
| b | d | a | b |
| b | d | a | c |
| b | d | a | d |
| b | d | a | D |
| b | d | b | a |
| b | d | b | b |
| b | d | b | c |
| b | d | b | d |
| b | d | b | D |
| b | d | c | a |
| b | d | c | b |
| b | d | c | c |
| b | d | c | d |
| b | d | c | D |
| b | d | d | a |
| b | d | d | b |
| b | d | d | c |
| b | d | d | d |
| b | d | d | D |
| b | d | D | a |
| b | d | D | b |
| b | d | D | c |
| b | d | D | d |
| b | d | D | D |
| b | D | a | a |
| b | D | a | b |
| b | D | a | c |
| b | D | a | d |
| b | D | a | D |
| b | D | b | a |
| b | D | b | b |
| b | D | b | c |
| b | D | b | d |
| b | D | b | D |
| b | D | c | a |
| b | D | c | b |
| b | D | c | c |

TABLE 5-continued

| A | C | G | U |
|---|---|---|---|
| b | D | c | d |
| b | D | c | D |
| b | D | d | a |
| b | D | d | b |
| b | D | d | c |
| b | D | d | d |
| b | D | d | D |
| b | D | D | a |
| b | D | D | b |
| b | D | D | c |
| b | D | D | d |
| b | D | D | D |
| c | a | a | a |
| c | a | a | b |
| c | a | a | c |
| c | a | a | d |
| c | a | a | D |
| c | a | b | a |
| c | a | b | b |
| c | a | b | c |
| c | a | b | d |
| c | a | b | D |
| c | a | c | b |
| c | a | c | c |
| c | a | c | d |
| c | a | c | D |
| c | a | d | a |
| c | a | d | b |
| c | a | d | c |
| c | a | d | d |
| c | a | d | D |
| c | a | D | a |
| c | a | D | b |
| c | a | D | c |
| c | a | D | d |
| c | a | D | D |
| c | b | a | a |
| c | b | a | b |
| c | b | a | c |
| c | b | a | d |
| c | b | a | D |
| c | b | b | a |
| c | b | b | b |
| c | b | b | c |
| c | b | b | d |
| c | b | b | D |
| c | b | c | a |
| c | b | c | b |
| c | b | c | c |
| c | b | c | d |
| c | b | c | D |
| c | b | d | a |
| c | b | d | b |
| c | b | d | c |
| c | b | d | d |
| c | b | d | D |
| c | b | D | a |
| c | b | D | b |
| c | b | D | c |
| c | b | D | d |
| c | b | D | D |
| c | c | a | a |
| c | c | a | b |
| c | c | a | c |
| c | c | a | d |
| c | c | a | D |
| c | c | b | a |
| c | c | b | b |
| c | c | b | c |
| c | c | b | d |
| c | c | b | D |
| c | c | c | a |
| c | c | c | b |
| c | c | c | c |
| c | c | c | d |
| c | c | c | D |
| c | c | d | a |

TABLE 5-continued

| A | C | G | U |
|---|---|---|---|
| c | c | d | b |
| c | c | d | c |
| c | c | d | d |
| c | c | d | D |
| c | c | D | a |
| c | c | D | b |
| c | c | D | c |
| c | c | D | d |
| c | c | D | D |
| c | d | a | a |
| c | d | a | b |
| c | d | a | c |
| c | d | a | d |
| c | d | a | D |
| c | d | b | a |
| c | d | b | b |
| c | d | b | c |
| c | d | b | d |
| c | d | b | D |
| c | d | c | a |
| c | d | c | b |
| c | d | c | c |
| c | d | c | d |
| c | d | c | D |
| c | d | d | a |
| c | d | d | b |
| c | d | d | c |
| c | d | d | d |
| c | d | d | D |
| c | d | D | a |
| c | d | D | b |
| c | d | D | c |
| c | d | D | d |
| c | d | D | D |
| c | D | a | a |
| c | D | a | b |
| c | D | a | c |
| c | D | a | d |
| c | D | a | D |
| c | D | b | a |
| c | D | b | b |
| c | D | b | c |
| c | D | b | d |
| c | D | b | D |
| c | D | c | a |
| c | D | c | b |
| c | D | c | c |
| c | D | c | d |
| c | D | c | D |
| c | D | d | a |
| c | D | d | b |
| c | D | d | c |
| c | D | d | d |
| c | D | d | D |
| c | D | D | a |
| c | D | D | b |
| c | D | D | c |
| c | D | D | d |
| c | D | D | D |
| d | a | a | a |
| d | a | a | b |
| d | a | a | c |
| d | a | a | d |
| d | a | a | D |
| d | a | b | a |
| d | a | b | b |
| d | a | b | c |
| d | a | b | d |
| d | a | b | D |
| d | a | c | a |
| d | a | c | b |
| d | a | c | c |
| d | a | c | d |
| d | a | c | D |
| d | a | d | a |
| d | a | d | b |
| d | a | d | c |
| d | a | d | d |

TABLE 5-continued

| A | C | G | U |
|---|---|---|---|
| d | a | d | D |
| d | a | D | a |
| d | a | D | b |
| d | a | D | c |
| d | a | D | d |
| d | a | D | D |
| d | b | a | a |
| d | b | a | b |
| d | b | a | c |
| d | b | a | d |
| d | b | a | D |
| d | b | b | a |
| d | b | b | b |
| d | b | b | c |
| d | b | b | d |
| d | b | b | D |
| d | b | c | a |
| d | b | c | b |
| d | b | c | c |
| d | b | c | d |
| d | b | c | D |
| d | b | d | a |
| d | b | d | b |
| d | b | d | c |
| d | b | d | d |
| d | b | d | D |
| d | b | D | a |
| d | b | D | b |
| d | b | D | c |
| d | b | D | d |
| d | b | D | D |
| d | c | a | a |
| d | c | a | b |
| d | c | a | c |
| d | c | a | d |
| d | c | a | D |
| d | c | b | a |
| d | c | b | b |
| d | c | b | c |
| d | c | b | d |
| d | c | b | D |
| d | c | c | a |
| d | c | c | b |
| d | c | c | c |
| d | c | c | d |
| d | c | c | D |
| d | c | d | a |
| d | c | d | b |
| d | c | d | c |
| d | c | d | d |
| d | c | d | D |
| d | c | D | a |
| d | c | D | b |
| d | c | D | c |
| d | c | D | d |
| d | c | D | D |
| d | d | a | a |
| d | d | a | b |
| d | d | a | c |
| d | d | a | d |
| d | d | a | D |
| d | d | b | a |
| d | d | b | b |
| d | d | b | c |
| d | d | b | d |
| d | d | b | D |
| d | d | c | a |
| d | d | c | b |
| d | d | c | c |
| d | d | c | d |
| d | d | c | D |
| d | d | d | a |
| d | d | d | b |
| d | d | d | c |
| d | d | d | d |
| d | d | d | D |
| d | d | D | a |
| d | d | D | b |

TABLE 5-continued

| A | C | G | U |
|---|---|---|---|
| d | d | D | c |
| d | d | D | d |
| d | d | D | D |
| d | D | a | a |
| d | D | a | b |
| d | D | a | c |
| d | D | a | d |
| d | D | a | D |
| d | D | b | a |
| d | D | b | b |
| d | D | b | c |
| d | D | b | d |
| d | D | b | D |
| d | D | c | a |
| d | D | c | b |
| d | D | c | c |
| d | D | c | d |
| d | D | c | D |
| d | D | d | a |
| d | D | d | b |
| d | D | d | c |
| d | D | d | d |
| d | D | d | D |
| d | D | D | a |
| d | D | D | b |
| d | D | D | c |
| d | D | D | d |
| d | D | D | D |
| D | a | a | a |
| D | a | a | b |
| D | a | a | c |
| D | a | a | d |
| D | a | a | D |
| D | a | b | a |
| D | a | b | b |
| D | a | b | c |
| D | a | b | d |
| D | a | b | D |
| D | a | c | a |
| D | a | c | b |
| D | a | c | c |
| D | a | c | d |
| D | a | c | D |
| D | a | d | a |
| D | a | d | b |
| D | a | d | c |
| D | a | d | d |
| D | a | d | D |
| D | a | D | a |
| D | a | D | b |
| D | a | D | c |
| D | a | D | d |
| D | a | D | D |
| D | b | a | a |
| D | b | a | b |
| D | b | a | c |
| D | b | a | d |
| D | b | a | D |
| D | b | b | a |
| D | b | b | b |
| D | b | b | c |
| D | b | b | d |
| D | b | b | D |
| D | b | c | a |
| D | b | c | b |
| D | b | c | c |
| D | b | c | d |
| D | b | c | D |
| D | b | d | a |
| D | b | d | b |
| D | b | d | c |
| D | b | d | d |
| D | b | d | D |
| D | b | D | a |
| D | b | D | b |
| D | b | D | c |
| D | b | D | d |
| D | b | D | D |

TABLE 5-continued

| A | C | G | U |
|---|---|---|---|
| D | c | a | a |
| D | c | a | b |
| D | c | a | c |
| D | c | a | d |
| D | c | a | D |
| D | c | b | a |
| D | c | b | b |
| D | c | b | c |
| D | c | b | d |
| D | c | b | D |
| D | c | c | a |
| D | c | c | b |
| D | c | c | c |
| D | c | c | d |
| D | c | c | D |
| D | c | d | a |
| D | c | d | b |
| D | c | d | c |
| D | c | d | d |
| D | c | d | D |
| D | c | D | a |
| D | c | D | b |
| D | c | D | c |
| D | c | D | d |
| D | c | D | D |
| D | d | a | a |
| D | d | a | b |
| D | d | a | c |
| D | d | a | d |
| D | d | a | D |
| D | d | b | a |
| D | d | b | b |
| D | d | b | c |
| D | d | b | d |
| D | d | b | D |
| D | d | c | a |
| D | d | c | b |
| D | d | c | c |
| D | d | c | d |
| D | d | c | D |
| D | d | d | a |
| D | d | d | b |
| D | d | d | c |
| D | d | d | d |
| D | d | d | D |
| D | d | D | a |
| D | d | D | b |
| D | d | D | c |
| D | d | D | d |
| D | d | D | D |
| D | D | a | a |
| D | D | a | b |
| D | D | a | c |
| D | D | a | d |
| D | D | a | D |
| D | D | b | a |
| D | D | b | b |
| D | D | b | c |
| D | D | b | d |
| D | D | b | D |
| D | D | c | a |
| D | D | c | b |
| D | D | c | c |
| D | D | c | d |
| D | D | c | D |
| D | D | d | a |
| D | D | d | b |
| D | D | d | c |
| D | D | d | d |
| D | D | d | D |
| D | D | D | a |
| D | D | D | b |
| D | D | D | c |
| D | D | D | d |
| D | D | D | D |

A polyribonucleotide according to the present invention can further contain isotopes other than deuterium. The term "isotope" refers to an element having the same number of protons but different number of neutrons resulting in different mass numbers. Thus, isotopes of hydrogen for example are not limited to deuterium, but include also tritium. Furthermore, the polyribonucleotide can also contain isotopes of other elements including for example carbon, oxygen, nitrogen and phosphor.

In addition to the deuterated nucleotides, a polyribonucleotide according to the present invention can further comprise one or more types of modified nucleotides. The term "modified nucleotide" used herein refers to any naturally occurring or chemically synthesized isomers of the four types of nucleotides, i.e. adenosine, guanosine, cytidine and uridine, as well as to any naturally occurring or chemically synthesized analogs, alternative or modified nucleotide or isomer thereof having for example chemical modifications or substituted residues. Modified nucleotides can have a base modification and/or a sugar modification. Modified nucleotides can also have phosphate group modifications, e.g., with respect to the five prime cap of polyribonucleotides comprising a sequence which encodes a protein. Modified nucleotides also include nucleotides that are synthesized post-transcriptionally by covalent modification of the nucleotides. Further, any suitable mixture of non-modified and modified nucleotides is possible. A non-limiting number of examples of modified nucleotides can be found in the literature (e.g. Cantara et al., Nucleic Acids Res, 2011, 39(Issue suppl_1):D195-D201; Helm and Alfonzo, Chem Biol, 2014, 21(2):174-185; Carell et al., Angew Chem Int Ed Engl, 2012, 51(29):7110-31) and is given exemplarily in the following based on their respective nucleoside residue: 1-methyladenosine, 2-methylthio-N6-hydroxynorvalyl carbamoyladenosine, 2-methyladenosine, 2-O-ribosylphosphate adenosine (preferably 2'-O-ribosylphosphate adenosine), N6-methyl-N6-threonylcarbamoyladenosine, N6-acetyladenosine, N6-glycinylcarbamoyladenosine, N6-isopentenyladenosine, N6-methyladenosine, N6-threonylcarbamoyladenosine, N6,N6-dimethyladenosine, N6-(cis-hydroxyisopentenyl)adenosine, N6-hydroxynorvalylcarbamoyladenosine, 1,2-O-dimethyladenosine (preferably 1,2'-O-dimethyladenosine), N6,2-0-dimethyladenosine (preferably N6,2'-O-dimethyladenosine), 2-O-methyladenosine (preferably 2'-O-methyladenosine), N6,N6,0-2-trimethyladenosine (preferably N6,N6,2'-O-trimethyladenosine), 2-methylthio-N6-(cis-hydroxyisopentenyl) adenosine, 2-methylthio-N6-methyladenosine, 2-methylthio-N6-isopentenyladenosine, 2-methylthio-N6-threonyl carbamoyladenosine, N6-2-methylthio-N6-threonyl carbamoyladenosine, 2-methylthio-N6-(cis-hydroxyisopentenyl)adenosine, 7-methyladenosine, 2-methylthio-adenosine, 2-methoxy-adenosine, 2'-amino-2'-deoxyadenosine, 2'-azido-2'-deoxyadenosine, 2'-fluoro-2'-deoxyadenosine, 2-aminopurine, 2,6-diaminopurine, 7-deaza-adenosine, 7-deaza-8-aza-adenosine, 7-deaza-2-aminopurine, 7-deaza-8-aza-2-aminopurine, 7-deaza-2,6-diaminopurine, 7-deaza-8-aza-2,6-diaminopurine; 2-thiocytidine, 3-methylcytidine, N4-acetylcytidine, 5-formylcytidine, N4-methylcytidine, 5-methylcytidine, 5-hydroxymethylcytidine, 5-hydroxycytidine, lysidine, N4-acetyl-2-0-methylcytidine (preferably N4-acetyl-2'-O-methylcytidine), 5-formyl-2-0-methylcytidine (preferably 5-formyl-2'-O-methylcytidine), 5,2-O-dimethylcytidine (preferably 5,2'-O-dimethylcytidine), 2-O-methylcytidine, N4,2-0-dimethylcytidine (preferably N4,2'-O-dimethylcytidine), N4,N4,2-0-trimethylcytidine (preferably N4,N4,2'-O-trimethylcytidine), isocytidine, pseudocytidine, pseudoisocytidine, 2-thio-cytidine, 2'-methyl-2'-deoxycytidine, 2'-amino-2'-deoxycytidine, 2'-fluoro-2'-deoxycytidine, 5-iodocytidine, 5-bromocytidine, 2'-azido-2'-deoxycytidine, 2'-amino-2'-deoxycytidine, 2'-fluor-2'-deoxycytidine, 5-azacytidine, 3-methyl-cytidine, 1-methyl-pseudoisocytidine, pyrrolo-cytidine, pyrrolo-pseudoisocytidine, 2-thio-5-methyl-cytidine, 4-thio-pseudoisocytidine, 4-thio-1-methyl-pseudoisocytidine, 4-thio-1-methyl-1-deaza-pseudoisocytidine, 1-methyl-1-deaza-pseudoisocytidine, 2-methoxycytidine, 2-methoxy-5-methyl-cytidine, 4-methoxy-pseudoisocytidine, 4-methoxy-1-methyl-pseudoisocytidine, zebularine,5-aza-zebularine, 5-methyl-zebularine, 5-aza-2-thio-zebularine, 2-thio-zebularine; 1-methylguanosine, N2,7-dimethylguanosine, N2-methylguanosine, 2-O-ribosylphosphate guanosine (preferably 2'-O-ribosylphosphate guanosine), 7-methylguanosine, hydroxywybutosine, 7-aminomethyl-7-deazaguanosine, 7-cyano-7-deazaguanosine, N2,N2-dimethylguanosine, N2,7,2-0-trimethylguanosine (preferably N2,7,2'-O-trimethylguanosine), N2,2-0-dimethylguanosine (preferably N2,2'-O-dimethylguanosine), 1,2-O-dimethylguanosine (preferably 1,2'-O-dimethylguanosine), 2-0-methylguanosine (preferably 2'-O-methylguanosine), N2,N2,2-O-trimethylguanosine (preferably N2,N2,2'-O-trimethylguanosine), N2,N2J-trimethylguanosine, Isoguanosine, 4-demethylwyosine, epoxyqueuosine, undermodified hydroxywybutosine, methylated undermodified hydroxywybutosine, isowyosine, peroxywybutosine, galactosyl-queuosine, mannosyl-queuosine, queuosine, archaeosine, wybutosine, methylwyosine, wyosine, 7-aminocarboxypropyldemethylwyosine, 7-aminocarboxypropylwyosine, 7-aminocarboxypropylwyosine methylester (preferably 7-aminocarboxypropylwyosinemethylester), 7-deaza-guanosine, 7-deaza-8-aza-guanosine, 6-thio-guanosine, 6-thio-7-deaza-guanosine, 6-thio-7-deaza-8-aza-guanosine, 7-methyl-guanosine, 6-thio-7-methyl-guanosine, 7-methylinosine, 6-methoxy-guanosine, 1-methylguanosine, 8-oxo-guanosine, 7-methyl-8-oxo-guanosine, 1-methyl-6-thio-guanosine, N2-methyl-6-thio-guanosine, N2,N2-dimethyl-6-thio-guanosine, N1-methylguanosine, 2'-amino-3'-deoxyguanosine, 2'-azido-2'-deoxyguanosine, 2'-fluoro-2'-deoxyguanosine, 2-thiouridine, 3-(3-amino-3-carboxypropyl)uridine, 3-methyluridine, 4-thiouridine, 5-methyl-2-thiouridine, 5-methylaminomethyluridine, 5-carboxymethyluridine, 5-carboxymethylaminomethyluridine, 5-hydroxyuridine, 5-methyluridine, 5-taurinomethyluridine, 5-carbamoylmethyluridine, 5-(carboxyhydroxymethyl)uridine methyl ester, dihydrouridine, 5-methyldihydrouridine, 5-methylaminomethyl-2-thiouridine, 5-(carboxyhydroxymethyl)uridine, 5-(carboxyhydroxymethyl)-2'-O-methyluridine methyl ester, 5-(isopentenylaminomethyl)uridine, 5-(isopentenylaminomethyl)-2-thiouridine, 3,2-O-dimethyluridine (preferably 3,2'-O-dimethyluridine), 5-carboxymethylaminomethyl-2-O-methyluridine (preferably 5-carboxymethylaminomethyl-2'-O-methyluridine), 5-carbamoylhydroxymethyluridine, 5-carbamoylmethyl-2-O-methyluridine (preferably 5-carbamoylmethyl-2'-O-methyluridine), 5-carbamoylmethyl-2-thiouridine, 5-methoxycarbonylmethyl-2-O-methyluridine (preferably 5-methoxycarbonylmethyl-2'-O-methyluridine), 5-(isopentenylaminomethyl)-2-O-methyluridine (preferably 5-(isopentenylaminomethyl)-2'-O-methyluridine), 5,2-O-dimethyluridine (preferably 5,2'-O-dimethyluridine), 2-O-methyluridine (preferably 2'-O-methyluridine), 2-O-methyl-2-thiouridine (preferably 2'-O-methyl-2-thiorudine), 2-thio-2-O-methyluridine (preferably 2-thio-2'-O-methyluridine), uridine 5-oxyacetic acid, 5-methoxycarbonylmethyluridine, uridine 5-oxyacetic acid methyl ester, 5-methoxyuridine, 5-aminomethyl-2-thiouridine, 5-carboxymethylaminomethyl-2-thiouridine, 5-methylaminomethyl-2-selenouridine, 5-methoxycarbonylmethyl-2-thiouridine, 5-taurinomethyl-2-thiouridine, pseudouridine, 1-methyl-3-(3-amino-3-carboxypropyl)pseudouridine, 1-methylpseudouridine, 3-methylpseudouridine, 2-O-methylpseudouridine (preferably 2'-O-methylpseudouridine), 5-formyluridine, 5-aminomethyl-2-geranyluridine, 5-taurinomethyluridine, 5-iodouridine, 5-bromouridine, 2'-methyl-2'-deoxyuridine, 2'-amino-2'-deoxyuridine, 2'-azido-2'-deoxyuridine, 2'-fluoro-2'-deoxyuridine, inosine, 1-methylinosine, 1,2-O-dimethylinosine (preferably 1,2'-O-dimethylinosine), 2-O-methylinosine (preferably 2'-O-methylinosine), 5-azauridine, 2-thio-5-aza-uridine, 4-thio-pseudouridine, 2-thiopseudouridine, 5-carboxymethyl-uridine, 1-carboxymethyl-pseudouridine, 5-propynyl-uridine, 1-propynyl-pseudouridine, 1-taurinomethyl-pseudouridine, 5-taurinomethyl-2-thio-uridine, 1-taurinomethyl-4-thio-uridine, 5-methyl-uridine, 1-methyl-pseudouridine, 4-thio-1-methyl-pseudouridine, 2-thio-1-methyl-pseudouridine, 1-methyl-1-deaza-pseudouridine, 2-thio-1-methyl-1-deaza-pseudouridine, dihydropseudouridine, 2-thio-dihydrouridine, 2-thio-dihydropseudouridine, 2-methoxyuridine, 2-methoxy-4-thio-uridine, 4-methoxy-pseudouridine, 4-methoxy-2-thio-pseudouridine, 1,2'-O-dimethyladenosine, 1,2'-O-dimethylguanosine, 1,2'-O-dimethylinosine, 2,8-dimethyladenosine, 2-methylthiomethylenethio-N6-isopentenyl-adenosine, 2-geranylthiouridine, 2-lysidine, 2-methylthio cyclic N6-threonylcarbamoyladenosine, 2-methylthio-N6-(cis-hydroxyisopentenyl) adenosine, 2-methylthio-N6-hydroxynorvalylcarbamoyladenosine, 2-methylthio-N6-threonylcarbamoyladenosine, 2-selenouridine, 2-thio-2'-O-methyluridine, 2'-O-methyladenosine, 2'-O-methylcytidine, 2'-O-methylguanosine, 2'-O-methylinosine, 2'-O-methylpseudouridine, 2'-O-methyluridine, 2'-O-methyluridine 5-oxyacetic acid methyl ester, 2'-O-ribosyladenosinephosphate, 2'-O-ribosylguanosinephosphate, 3,2'-O-dimethyluridine, 3-(3-amino-3-carboxypropyl)-5,6-dihydrouridine, 3-(3-amino-3-carboxypropyl)pseudouridine, 5,2'-O-dimethylcytidine, 5,2'-O-dimethyluridine, 5-(carboxyhydroxymethyl)-2'-O-methyluridine methyl ester, 55-(isopentenylaminomethyl)-2'-O-methyluridine, 5-aminomethyl-2-geranylthiouridine, 5-aminomethyl-2-selenouridine, 5-aminomethyluridine, 5-carbamoylmethyl-2'-O-methyluridine, 5-carboxyhydroxymethyluridine, 5-carboxymethyl-2-thiouridine, 5-carboxymethylaminomethyl-2-geranylthiouridine, 5-carboxymethylaminomethyl-2-selenouridine, 5-carboxymethylaminomethyl-2'-O-methyluridine, 5-cyanomethyluridine, 5-formyl-2'-O-methylcytidine, 5-methoxycarbonylmethyl-2'-O-methyluridine, 5-methylaminomethyl-2-geranylthiouridine, 7-aminocarboxypropyl-demethylwyosine, 7-methylguanosine, 8-methyladenosine, N2,2'-O-dimethylguanosine, N2,7,2'-O-trimethylguanosine, N2,7-dimethylguanosine, N2,N2,2'-O-trimethylguanosine, N2,N2,7-trimethylguanosine, N2,N2,7-trimethylguanosine, N4,2'-O-dimethylcytidine, N4,N4,2'-O-trimethylcytidine, N4,N4-dimethylcytidine, N4-acetyl-2'-O-methylcytidine, N6,2'-O-dimethyladenosine, N6,N6,2'-O-trimethyladenosine, N6-formyladenosine, N6-hydroxymethyladenosine, agmatidine, 2-methylthio cyclic N6-threonylcarbamoyladenosine, glutamyl-queuosine, guanosine added to any nucleotide, guanylylated 5' end, hydroxy-N6-threonylcarbamoyladenosine; most preferably pseudo-uridine, N1-methyl-pseudo-uridine, 2'-fluoro-2'-deoxycytidine, 5-iodocytidine, 5-methylcytidine, 2-thiouridine, 5-iodouridine and/or 5-methyl-uridine.

The polyribonucleotide according to the present invention can for example be characterized in that 0.5 to 50%, preferably 5 to 50% of the U nucleotides and 5 to 50% of the C nucleotides are modified. Said modified U nucleotides are preferably 5-ioduridine and said modified C nucleotides are preferably 5-iodcytidine. In some embodiments, the polyribonucleotide to be purified can be characterized in that 15 to 25% of the U nucleotides and 3 to 15%, preferably 5 to 15% of the C nucleotides are modified, wherein said modified U nucleotides are preferably 5-methyluridine and said modified C nucleotides are preferably 5-iodcytidine. In some embodiments, the polyribonucleotide to be purified can be characterized in that 30 to 50% of the U nucleotides and 10 to 20% of the C nucleotides are modified, wherein said modified U nucleotides are preferably 5-ioduridine and said modified C nucleotides are preferably 5-iodcytidine.

In some embodiments, the polyribonucleotide to be purified can be characterized in that 30 to 50% of the U nucleotides and 5 to 15% of the C nucleotides are modified, wherein said modified U nucleotides are preferably 5-ioduridine and said modified C nucleotides are preferably 5-iodcytidine.

In some embodiments, the polyribonucleotide to be purified can be characterized in that 0.5 to 25%, preferably 0.5 to 5% of the U nucleotides and 25 to 35% of the C nucleotides are modified, wherein said modified U nucleotides are preferably 2-thiouridine and said modified C nucleotides are preferably 5-methylcytidine.

The polyribonucleotide to be purified can for example also be characterized in that 50 to 100%, preferably 100%, of the U nucleotides are modified. Said modified U nucleotides are preferably N1-methyl-pseudo-uridine.

It is also possible that such modified nucleotides which can be contained in a polyribonucleotide according to the present invention in addition to the deuterated nucleotides are themselves deuterated or contain another isotope of hydrogen or of oxygen, carbon, nitrogen or phosphor.

For example, a polyribonucleotide according to the present invention can further contain deuterated N1-methyl-pseudo-uridine residues and/or 5-methyl-uridine residues. As regards the location of the deuteration, the degree of deuteration in the nucleotide residue and as regards the percentage of corresponding deuterated residues in the polynucleotide, the same applies as has been set forth above in connection with the deuterated adenosine, cytidine, guanosine and uridine residues. Moreover, such modified nucleotides can of course also be deuterated at the substituents which represent the modification, e.g., at methyl groups or the like, as far as such substituents contain hydrogen atoms. This is illustrated, e.g., by deutN1mψU and deutm5U used in the Examples.

The polyribonucleotide according to the present invention comprises a sequence which encodes a protein. As explained above, the term "protein" here encompasses any kind of amino acid sequence, i.e., chains of two or more amino acids which are each linked via peptide bonds and also includes peptides, polypeptides, protein fragments, and fusion proteins. A protein encoded by said polyribonucleotide can be for example a factor, inducer, regulator, stimulator or enzyme.

The term "translation kinetic" used herein in connection with the expression of a protein refers to the amount of protein produced by translation of a polyribonucleotide comprising a sequence which encodes said protein over time. In the Examples, translation kinetic refers to the change of luciferase activity over time.

Polyribonucleotides according to the present invention lend themselves to applications in supplemental or medical purposes to generate or regenerate physiological functions caused by suboptimal protein biosynthesis and thus also to favorably influence directly or indirectly the course of diseases.

Hence, the protein encoded by the polyribonucleotide according to the invention has preferably a beneficial effect on an organism. Disorders with known genetic base are for example cystic fibrosis, haemophilia, hypertension, elevated cholesterol level, cancer, neurodegenerative disorders, mental illness and others. An online catalogue with presently 22,993 entries of Human Genes and Genetic Disorders together with their respective genes and a description of their phenotypes are available at the ONIM (Online Mendelian Inheritance in Man) webpage (http://onim.org); sequences of each are available from the Uniprot database (http://www.uniprot.org). As non-limiting examples, the following Table 6 lists some congenital diseases, and the corresponding gene(s). Due to the high degree of interaction of cellular signalling pathways, the mutation of a certain gene causes a multiply of pathogenic symptoms, of which only a characteristic one is listed in Table 6.

TABLE 6

| Disease | Pathology | Gene, heredity |
|---|---|---|
| Blood diseases | | |
| Fanconi Anemia | Anemia and neutropenia, evidence that a DNA repair mechanism is affected | FANCA, autosomal recessive |
| Hemophilia-A | Abnormal bleeding | Coagulation Factor VIII, X-chromosomal recessive |
| Hemophilia-B | Abnormal bleeding | Coagulation Factor IX, X-chromosomal recessive |
| Hereditary Spherocytosis (various types) | spherical-shaped erythrocytes (spherocytes) | Ankyrin (ANK1) |
| Paroxysmal nocturnal hemoglobinuria | Anemia and presence of blood in the urine | PIG-A, X-chromosomal |
| Porphyria cutanea tarda | Overproduction of heme, iron overload | Uroporphyrinogen decarboxylase (UROD), autosomal recessive |
| Severe combined immune deficiency (SCID) | Due to impaired DNA synthesis severe immune deficiency in humoral and cellular immunity | Adenosine deaminase, autosomal recessive, IL-2R-γ, JAK3, (IL-7R-α, RAG1/2, Artemis, CD3δ, CD3ε |
| Sickle-cell anemia | Abnormal hemoglobin (HbS) | β-Hemoglobin (HB), autosomal recessive |
| Thalassemia (α- and β form) | Lack of α- or β hemoglobin resulting in anemia | Deletion of HBA1 and/or HBA2, |
| Von Willebrand disease (three types known, Type-III is most severe) | Abnormal bleeding, hemorrhage similar to hemophilia A and B | Autosomal dominant and recessive forms |
| Cancer | | |
| Malignant melanoma | P16 mutation leads to uncontrolled proliferation of fibroblasts | Cyclie dependant kinase inhibitor 2 (CDKN2) |
| Neurofibromatosis (2 types) | Benign tumors on auditory nerves leads to deafness | NF1, NF2, autosomal dominant |
| Deafness (Ear) | | |
| Deafness | Hearing loss | Deafness-1A (DFNB1), autosomal recessive |
| Pendred syndrome | Hearing loss | Pendrin (PDS), autosomal recessive |
| Heart | | |
| Ataxia telangiectasia | DNA damage repair disturbed, | ATM, |
| Atherosclerosis | Increase of blood cholesterol | apoE, |
| LQT Syndrome (Long QT) | Potassium channel defect | LQT1 and other genes |
| Von-Hippel Lindau Syndrome | Abnormal growth of blood vessels, can lead to cancer | VHL, autosomal dominant |
| William's Beuren Syndrome | Deletion of elastin results in vascular defects, supravalvular aortic stenosis | Deletion of elastin and LIM kinase genes |
| Metabolic disorders and glycogen storage diseases | | |
| Adrenoleukodystrophy | Disturbed fatty acid transport and metabolism | ABCD1, X-chromosomal |
| Alkaptonuria | Nitrogen metabolism defect, Urine turns dark when exposed to oxygen | Homogentisic Oxidase, autosomal recessive |

TABLE 6-continued

| Disease | Pathology | Gene, heredity |
| --- | --- | --- |
| Diabetes type I | Disturbed insulin production | IDDM1, IDDM2, GCK, . . . |
| Galactosemia | disorder of galactose metabolism | Galactose-1-phosphate uridyltransferase gene (GALT), autosomal recessive |
| Gauche disease | Disturbance of fat metabolism | Glucocerebrosidase |
| Glucose Galactosidase Malabsorption | Disturbed glucose and galactose transport out of the intestinal lumen resulting in diarrhea | SGLT1, autosomal recessive |
| Glycogen storage disease Type I, Von-Gierke's disease | Accumulation of glucose in liver and kidney | Glucose-6-Phosphatase, autosomal recessive |
| Glycogen storage disease Type II, Pompe's disease | Accumulation of glycogen in liver, heart, skeletal muscle, cardiomegaly | $\alpha$-1-Glucosidase, autosomal recessive |
| Glycogen storage disease Type III, Cori's disease | Accumulation of glycogen in liver, heart, skeletal muscle, hepatoomegaly | Debranching enzyme, autosomal recessive |
| Glycogen storage disease Type V, McArdle's disease | Cannot untilize glycogen in muscle cells | Muscle phosphorylase, autosomal recessive |
| Glucose-6-Phosphate Dehydrogenase | Inability to maintain glutathione leads to hemolytic anemia | G6PD, X-chromosomal recessive |
| Hereditary Hemochromatosis (4 types) | Excess of iron in the body (esp. liver) due to excessive iron absorption in the gut | Hemochromatosis (HFE) |
| Homocystinuria | Nitrogen metabolism defect | Cystathione synthetase defect, autosomal recessive |
| Lesh Nyhan Syndrome | Accumulation of uric acid leading to gout, ureate stones and muscle loss | HPRT1, X-chromosomal |
| Maple Syrup Urine Disease | Amino acid metabolism defect leads to the accumulation of $\alpha$-Ketoacides and death in the first months if untreated | Branched-chain-alpha-dehydrogenase (BCKDH) |
| Menkes' Syndrome | Reduced ability to absorb copper, leads to death in infancy if untreated | ATP7A, X-chromosomal recessive |
| Obesity | Elevated body weight | Polygenic, elevated leptin levels may play a role |
| Phenylketonuria | Inability to break down Phenylalanine into tyrosine leads to mental retardation | Phenylalanine hydroxylase (PAH), autosomal recessive |
| Tangier disease | reduced levels of plasma high density lipoproteins | ATP-binding cassette-1 gene (ABCA1) |
| Zellweger Syndrome (leads to death in infants) | High levels of iron and copper in the blood | PXR1 (receptor on the surface of peroxisomes) |
| Wilsons Disease | Copper accumulation in brain and liver | ATP7B (P-type ATPase), autosomal recessive |
| Musculoskeletal system | | |
| Achondroplasis | Short stature with a large head due to slow proliferation of chondrocytes | Fibroblast growth factor receptor 3 (FGF3R), |
| Charcot-Marie-Tooth Syndrome and its more severe form Dejerine-Sottas Syndrome | Degeneration of the muscles in limbs | Different forms caused by different gene mutations, autosomal recessive and X-chromosomal |
| Cockayne syndrome (2 types) | Premature aging and short stature, loss of "on the fly" DNA repair | group 8 excision repair cross-complementing protein (ERCC8) |
| Chondroectodermal dysplasia | Malformation of bones and polydactyly | EVC, autosomal recessive |
| Diastrophic dysplasia (DTD) | Malformed hands, sulfate transporter defect | DTDST gene |
| Duchenne muscular dystrophy | Enlargement of muscle tissue with subsequent loss of function | DMD, X-chromosomal recessive |
| Fibrodysplasia Ossificans Progressiva | Heterotopic bone formation | NOG, BMP, Autosomal dominant |

TABLE 6-continued

| Disease | Pathology | Gene, heredity |
| --- | --- | --- |
| Friedreich's ataxia | Heart enlargement and progressive loss of muscular coordination | Frataxin, autosomal recessive |
| Hypophosphatasia | Production of an abnormal version of alkaline phosphatase affecting the mineralization process | ALPL, autosomal recessive |
| Marfan Syndrome | Connective tissue disorder due fibrillin deficiency | Fibrillin 1 (FBN), autosomal dominant |
| Myotonic dystrophy (onset during young adulthood) | Protein kinase defect in skeletal muscle cells | Dystrophia myotonica protein kinase (DMPK), autosomal dominant |
| Osteogenesis imperfect (various types) | Defect in type-I collagen formation leads to multiple fractures after birth | COL1A1, COL1A2 |
| Prader-Willi Syndrome | Decreased muscle tone and mental retardation | SNRPN (small ribinucleoprotein N) deleted due to a deletion on chromosome 15 |
| Neurons and Brain | | |
| Alzheimer disease | Increased amyloid production, progressive inability to remember facts | Polygenic, PS1, PS2, . . . |
| Amyotrophic lateral sclerosis (ALS) (various forms) | Progressive degeneration of motor neuron cells (defect in elimination superoxide radicals) | Superoxide dismutase 1 (SOD1), various genes involved |
| Angelman syndrome | Mental retardation with inadequate laughing | Genomic imprinting on chromosome 15 |
| Pyruvat dehydrogenase | Neurological defects if untreated | Pyruvat dehydrogenase, autosomal recessive |
| Refsum disease | Accumulation of phytanic acid leads to peripheral neuropathy | Phytanoyl-CoA hydroxylase (PHYH), autosomal recessive |
| Rett's syndrome | Mental retardation with arrested development between 6 and 18 months of age | Methyl-CpG-binding protein-2 (MECP2), X-chromosomal dominant |
| Tay-Sachs disease (various forms of severity) | Disturbed break down of GM2 ganglioside leads to neurological damage | HEXA (β-hexosaminidas A), autosomal recessive |
| LaFora Disease | Aggressive form of epilepsy | EPM2A, autosomal recessive |
| Essential tremor (variable forms) | Uncontrollable shaking | ETM1, ETM2, autosomal dominant |
| Fragile X syndrome | Lack of FMR1 RNA binding protein, mental retardation | FMR1 gene is not expressed due to an CGG amplification in the 5'UTR region |
| Huntington's disease | Progressive dementia with onset in adulthood | HTT (huntingtin), autosomal dominant |
| Intestine | | |
| Bartter's syndrome (3 types) | Renal disease | Kidney chloride channel B gene (CLCNKB), autosomal recessive |
| Polycystic kidney disease (2 types) | renal disease | PDK1, PDK2, autosomal dominant, there is also a autosomal recessive form known (ARPKD) |
| Lung | | |
| Alpha-1-antitrypsin | Defect alveoli due to uncontrolled release of elastase | SERPINA1, autosomal codominant |
| Asthma | Chronic inflammatory disorder of the airways | Polygenic |
| Cystic fibrosis | Excessively viscous mucous due to defective Cl$^-$ ion transport | CFTR (cystic fibrosis conductance transmembrane regulator), autosomal recessive |
| Surfactant metabolism dysfunction (various types) | Newborns are of normal body weight, but all fail to inflate | ATP-binding cassette transporter (ABCA3) |

TABLE 6-continued

| Disease | Pathology | Gene, heredity |
|---|---|---|
| Primary ciliary dyskinesia | Excessively viscous mucous due to defective/missing cilia function | DNAI1, CCNO, CCDC40 among others |
| Lysosomal storage diseases | | |
| Fabry's disease | Beyond others, skin lesions due to the accumulation of ceramide trihexoside | α-Galactosidase A, X-chromosomal recessive |
| Gaucher's Disease Type-I: adult form (normal lifespan under treatment) Type-II: infantile form (death before age 1) Type-III: juvenile form (onset in early childhood, less severe than Type-II) | Accumulation of glucocerebrosides (gangliosides, sphingolipids) | Glucocerebrosidase, autosomal recessive, |
| Hunter's Syndrome | Accumulation of mucopolysaccharides | L-iduronosulfat sulfatase, X-chromosomal recessive |
| Hurler's Syndrome (death by age of 10) | Accumulation of mucopolysaccharides | α-L-iduronidase, autosomal recessive |
| Niemann-Pick Disease (three distinct forms A, B, C) | Defect in releasing Cholesterol from lysosomes, accumulation of Sphingomyelin | Sphingomyelinase, autosomal recessive |
| Tay-Sachs disease (death by age of 4) | Accumulation of $G_{M2}$ ganglioside in neuronal cells | Hexosaminidase A, autosomal recessive |
| Skin | | |
| Albinism | Nitrogen metabolism defect | Tyrosinase deficiency, autosomal recessive |
| Albinism, oculocutaneous, type II | Reduced biosynthesis of melanin pigment | OCA2, autosomal recessive |
| Ehlers-Danlos Syndrome (various types) | Diaphragmatic hernia. common, retinal detachment | Various defects in collagen synthesis |
| Epidermolysis bullosa (various types including EB simplex, Junctional EB, Dystrophic EB and Kindler syndrome) | Defects in maintenance of keratinocyte structural stability or adhesion of the keratinocyte to the underlying dermis | Epidermolysis bullosa macular type (EBM), Epidermolysis bullosa 3 progressiva (EBR3), Epidermolysis bullosa 4 pseudojunctual (EBR4), Desmoplakin (DSP), Plakophilin-1 (PKP1), kreatin (KRT5, KRT14), plectin (PLEC), ITGA6, integrin subunit (ITGB4), laminin subunits (LAMA3, LAMP3, LAMB3, LAMC2), collagen (COL17A1, COL7A1 (autosomal dominant), FERMT1, autosomal recessive |
| Hartnup's disease | Defect in tryptophan uptake in the gastrointestinal tract, light-sensitive skin | SLC6A19, autosomal recessive |
| Hereditary Hemorrhagic Telangiectasia, Osler-Weber-Rendu Syndrome | Telangiectasia of the skin and mucous membranes | Endoglin (ENG), autosomal dominant |
| Hypercholesterolemia, familial | elevation of serum cholesterol bound to low density lipoprotein, accumulation in skin and arteriosclerosis | Low-density lipoprotein receptor (LDLR), apolipoprotein B (APOB), autosomal dominant |
| Xeroderma pigmentosa | skin defect and melanoma due to UV exposure | DNA repair defect, autosomal recessive |
| Male pattern baldness | Disturbed conversion of testosterone into dihydrotestosterone in the skin | 5-α-reductase |

TABLE 6-continued

| Disease | Pathology | Gene, heredity |
|---|---|---|
| Genetic liver diseases | | |
| Amino acid metabolism disorders | Disruptions in the multistep process that breaks down the amino acid tyrosine and phenylalanine | FAH, TAT, HPD, autosomal recessive |
| Beta-thalassemia intermedia | Shortage of mature red blood cells | HBB, autosomal recessive |
| Crigler-Najjar syndrome | Deficiency in glucuronidation in which bilirubin gets dissolvable in water | UGT1A1, autosomal recessive |
| Fatty acid oxidation disorders | Deficiency in processing of long-chain fatty acids and very long-chain fatty acids resulting in lethargy and hypoglycemia | HADHA, ACADVL autosomal recessive |
| Fructose metabolism disorders | Impaired gluconeogenesis causing hypoglycemia | FBP1, ALDOB, autosomal recessive |
| Galactosemia | Deficiency in processing galactose | GALT, GALK1, GALE, autosomal recessive |
| Glycogen storage diseases | Disturbed breackdown of glucose 6-phosphate and glycogen leads to accumulation of glycogen as well as abnormal glycogen molecules causing cell damage | G6PC, SLC37A4, AGL, GBE1, autosomal recessive |
| Heme biosynthesis disorder | Decrease of uroporphyrinogen decarboxylase resulting in accumulation of compounds called porphyrins causing toxic levels in liver | UROD autosomal dominant, ALAS2 X-limked dominant, ALAD autosomal recessive |
| Lipid metabolism (transport) disorders | Shortage of functional protein, which prevents movement of cholesterol and other lipids, leading to their accumulation in cells | NPC1, NPC2 autosomal recessive, LDLR, autosomal dominant |
| Metal metabolism disorders | Disorders in the storage and transport of iron and copper resulting in accumulation in tissues and organs | ATP7B, HAMP, HFE, HFE2, autosomal recessive |
| Organic acid disorders (Acidurias/Acidemias) | Disrupted break down of several protein building blocks (amino acids), certain lipids, and cholesterol | BCKDHA, BCKDHB, and DBT, PCCA and PCCB, MUT, MMAA, MMAB, MMADHC, MCEE, IVD, MCCC1 or MCCC, autosomal recessive |
| Primary hyperoxaluria type 1 | Disrupted breakdown of glyoxylate leading to renal damage | AGXT, GRHPR, autosomal recessive |
| Progressive familial intrahepatic cholestasis | Buildup of bile acids in liver cells causing liver damage | ATP8B1, autosomal recessive |
| Thrombocyte activity disorder | Lack of enzyme activity disrupts the usual balance between bleeding and clotting | ADAMTS13, autosomal recessive |
| Urea cycle disorders | Disorder of the urea cycle which causes a form of hyperammonemia | OTC (X-linked disorder), CPS1, ASS1 and SLC25A13, ASL, autosomal recessive |

The protein encoded by the polyribonucleotide according to the present invention can also have the potential to induce an immunogenic reaction acting, e.g., as an antigen. Thus, polyribonucleotides according to the invention lend themselves to applications in supplemental or medical purposes including vaccination.

The present invention further relates to a pharmaceutical composition containing a polyribonucleotide as described above together with a pharmaceutically acceptable carrier. The polyribonucleotide is preferably included in an effective amount, i.e. an amount sufficient to induce a detectable therapeutic response in the subject to which the pharmaceutical composition is to be administered. The polyribonucleotide or the pharmaceutical composition of the invention may be in sterile aqueous or non-aqueous solutions, suspensions, and emulsions as well as creams and suppositories, but can also have the form of powders, tablets or aerosols.

The term "pharmaceutically acceptable carrier" used herein refers to chemical compounds, materials, ingredients, and/or compositions, which are, within the scope of sound medical judgment, suitable for use in contact with the tissues of human beings and animals without excessive toxicity, irritation, allergic response, or other problem or complication, commensurate with a reasonable benefit/risk ratio. Thus, a pharmaceutically acceptable carrier is an inactive substance formulated alongside the pharmaceutically active substance for facilitating its handling in view of dosage, adsorption, solubility or pharmacokinetic considerations.

Examples of suitable pharmaceutical acceptable carriers are well known in the art and include phosphate buffered saline solutions, buffer, water, emulsions, such as oil/water emulsions, various types of wetting agents, and sterile solutions. In particularly, aqueous carriers include water, alcoholic/aqueous solutions, emulsions or suspensions, including saline and buffered media. Examples of non-aqueous solvents are propylene glycol, polyethylene glycol, vegetable oils such as olive oil, and organic esters such as ethyl oleate. Further examples of pharmaceutically acceptable carriers include but are not limited to saline, Ringer's solution and dextrose solution, citrate, phosphate, and other organic acids; salt-forming counter-ions, e.g. sodium and potassium; low molecular weight (>10 amino acid residues) polypeptides; proteins, e.g. serum albumin, or gelatine; hydrophilic polymers, e.g. polyvinylpyrrolidone; amino acids such as histidine, glutamine, lysine, asparagine, arginine, or glycine; carbohydrates including glucose, mannose, or dextrins; monosaccharides; disaccharides; other sugars, e.g. sucrose, mannitol, trehalose or sorbitol; chelating agents, e.g. EDTA; non-ionic surfactants, e.g., polyoxyethylene sorbitan monolaurate, available on the market with the commercial name Tween, propylene glycol, Pluronics or polyethylene glycol; antioxidants including methionine, ascorbic acid and tocopherol; and/or preservatives, e.g. octadecyldimethylbenzyl ammonium chloride; hexamethonium chloride; benzalkonium chloride, benzethonium chloride; phenol, butyl or benzyl alcohol; alkyl parabens, e.g. methyl or propyl paraben; catechol; resorcinol; cyclohexanol; 3-pentanol; and m-cresol). Suitable pharmaceutically acceptable carriers and their formulations are described in greater detail in Remington's Pharmaceutical Sciences, 17th ed., 1985, Mack Publishing Co. Furthermore, preservatives, stabilizers and other additives may also be present such as, for example, antimicrobials, anti-oxidants, chelating agents, and inert gases, nanosystems or liposomes, and the like.

The pharmaceutical composition of the present invention may be administered via a large range of classes of forms of administration known to the skilled person, such as needle injection, the use of inhalators, creams, foams, gels, lotions and ointments.

Dose and duration of action depend on the function which said polyribonucleotide is to fulfill and have to be deliberately adjusted in each case. The duration of action will be as long as possible for example, if said polyribonucleotide is used for the chronic therapy of a disease due to a deficient gene, while with other indications it can be adjusted to a specific time window. Furthermore, systemic administration of said one or more deuterated polyribonucleotides is possible.

The present invention further relates to the use of deuterated adenosine, cytidine, guanosine, and/or uridine residues for the preparation of a polyribonucleotide comprising a sequence which encodes a protein or protein fragment, wherein said polyribonucleotide shows reduced immunogenicity and/or enhanced expression compared to a polyribonucleotide comprising the same sequence but without said deuterated nucleotides.

As regards the nature and degree of deuteration and the percentage of deuterated nucleotides in such a polyribonucleotide, as well as the reduction of immunogenicity or the enhancement of expression the same applies as has been described above in connection with the polyribonucleotides according to the invention. Moreover, also the other features of such a polyribonucleotide can be as described above.

The present invention further relates to the use of deuterated adenosine, cytidine, guanosine, and/or uridine residues for reducing the immunogenicity and/or enhancing the expression of a polyribonucleotide comprising a sequence which encodes a protein or protein fragment compared to a polyribonucleotide comprising the same sequence but without said deuterated nucleotides, said use comprising the incorporation of deuterated adenosine, cytidine, guanosine, and/or uridine residues into said polyribonucleotide.

As regards the nature and degree of deuteration and the percentage of deuterated nucleotides in such a polyribonucleotide, as well as the reduction of immunogenicity or the enhancement of expression the same applies as has been described above in connection with the polyribonucleotides according to the invention. Moreover, also the other features of such a polyribonucleotide can be as described above.

The present invention further relates to a method of providing a polyribonucleotide comprising a sequence which encodes a protein with reduced immunogenicity and/or enhanced expression, said method comprising the step of producing said polyribonucleotide by chemical synthesis or transcription in the presence of adenosine-5'-triphosphat, cytidine-5'-triphosphat, guanosine-5'-triphosphat, and/or uridine-5'-triphosphat, wherein at least one member of the group consisting of adenosine-5'-triphosphat, cytidine-5'-triphosphat, guanosine-5'-triphosphat, and/or uridine-5'-triphosphat is deuterated and wherein said produced polyribonucleotide contains deuterated nucleotides and shows reduced immunogenicity and/or enhanced expression compared to a polyribonucleotide comprising the same sequence but without said deuterated nucleotides.

As regards the nature and degree of deuteration and the percentage of deuterated nucleotides in such a polyribonucleotide, as well as the reduction of immunogenicity or the enhancement of expression the same applies as has been described above in connection with the polyribonucleotides according to the invention. Moreover, also the other features of such a polyribonucleotide can be as described above.

FIG. 1: Structural formulars show positions on which covalently bound Hydrogen was replaced by Deuterium (D).

Figure 2:
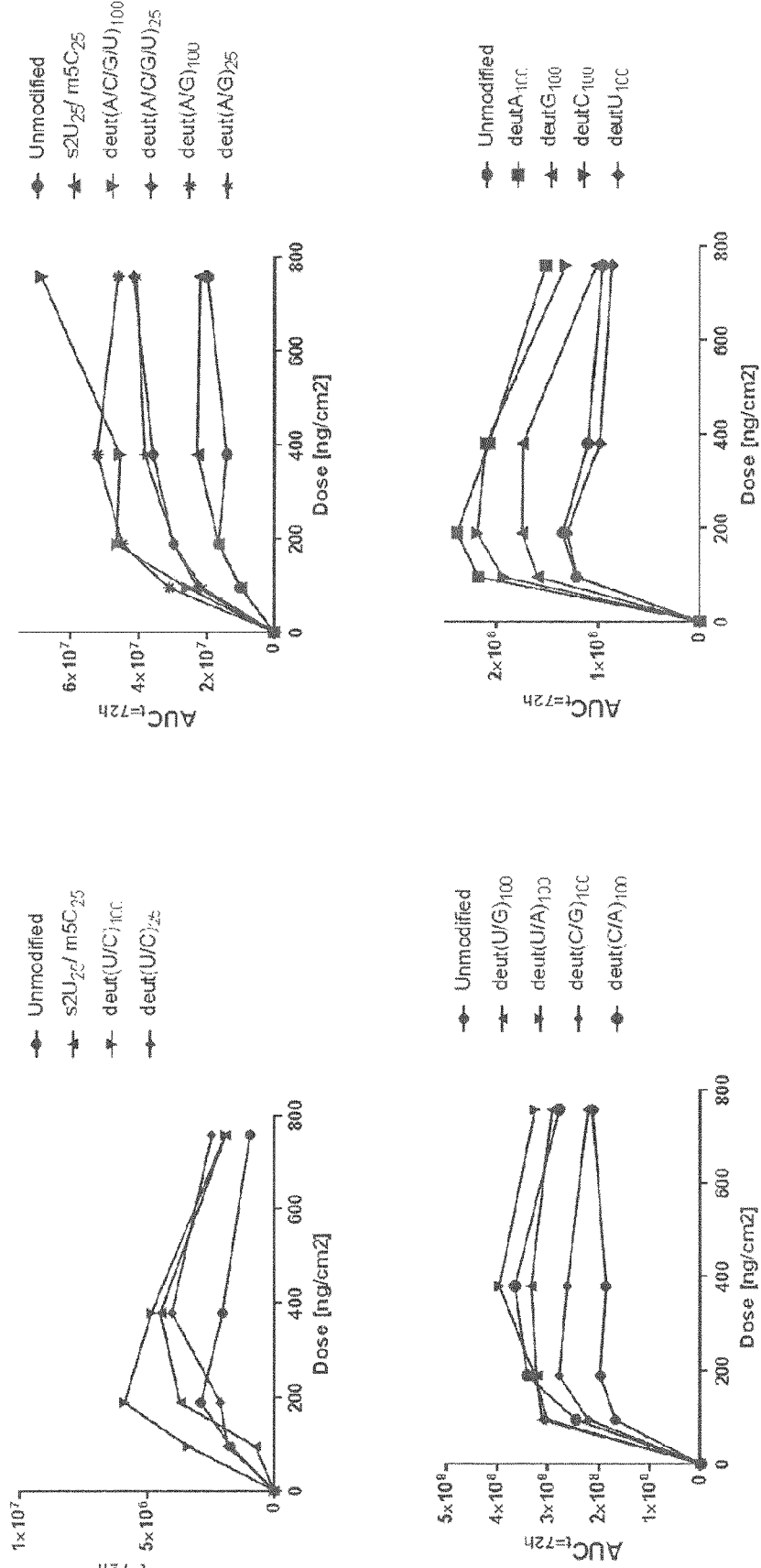
Figure 2:
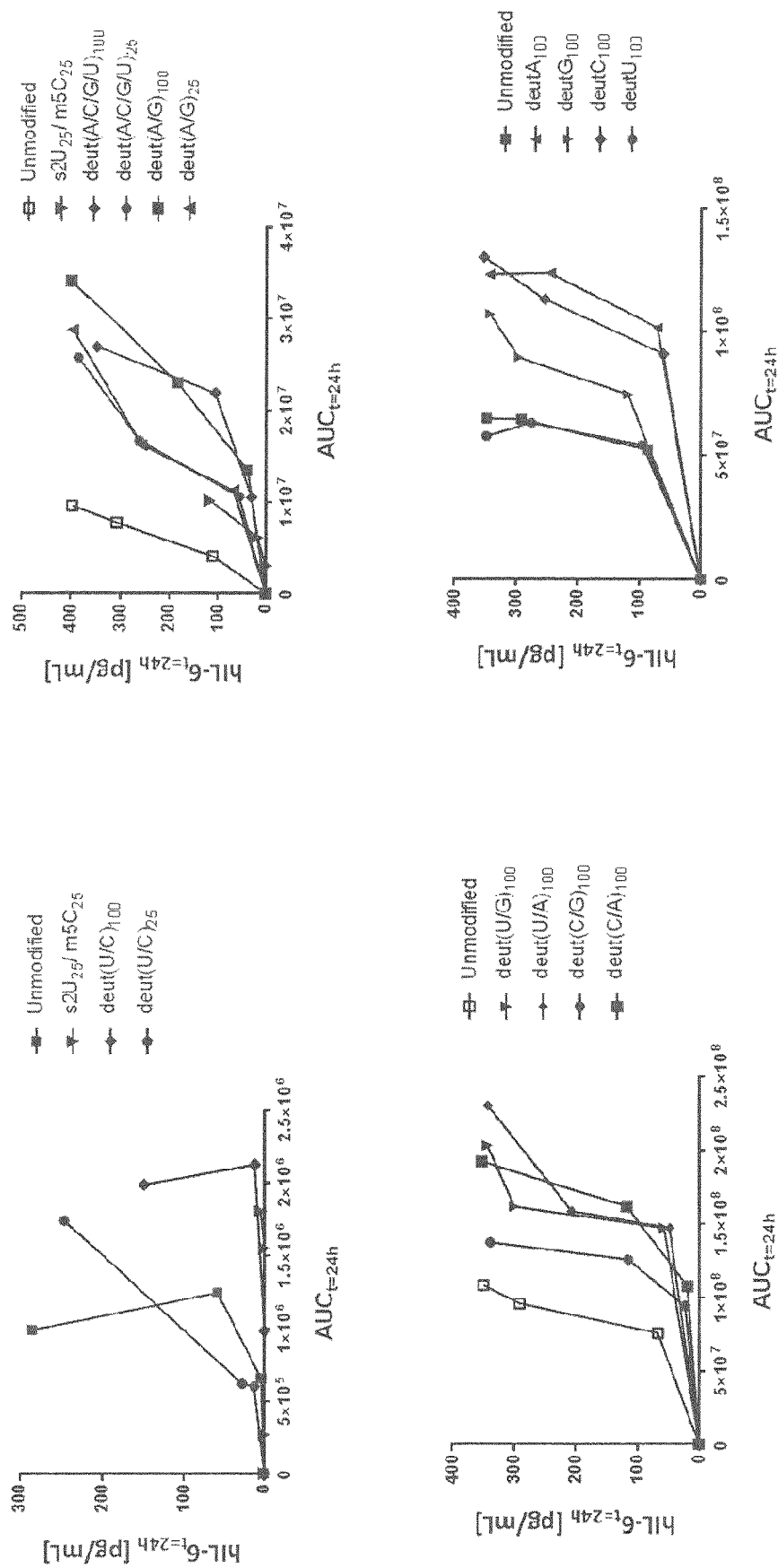
Figure 2:
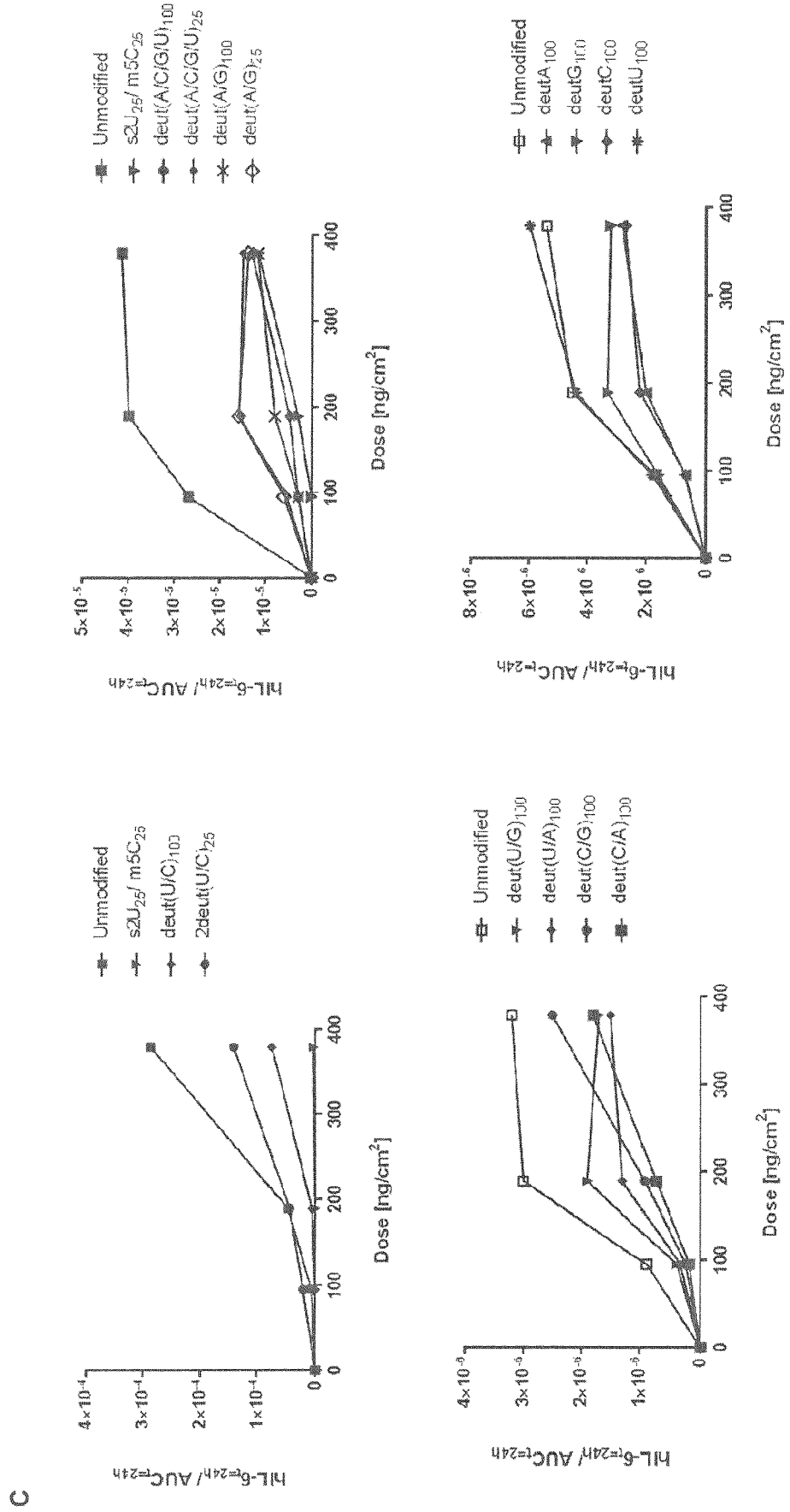

FIG. 2: Comparison of translation kinetic and hIL-6 cytokine induction of luciferase encoding polyribonucleotides containing non-deuterated and deuterated nucleotides. Panel A shows AUCt=72 h, calculated based on luciferase activity versus time, vs. dose, calculated by polyribonucleotides amount per 96-well [$cm^2$]; panel B hIL-6t=24 h vs. AUCt=24 h, calculated based on luciferase activity versus time; and panel C hIL-6t=24 h/AUCt=24 h vs. dose.

Figure 3:
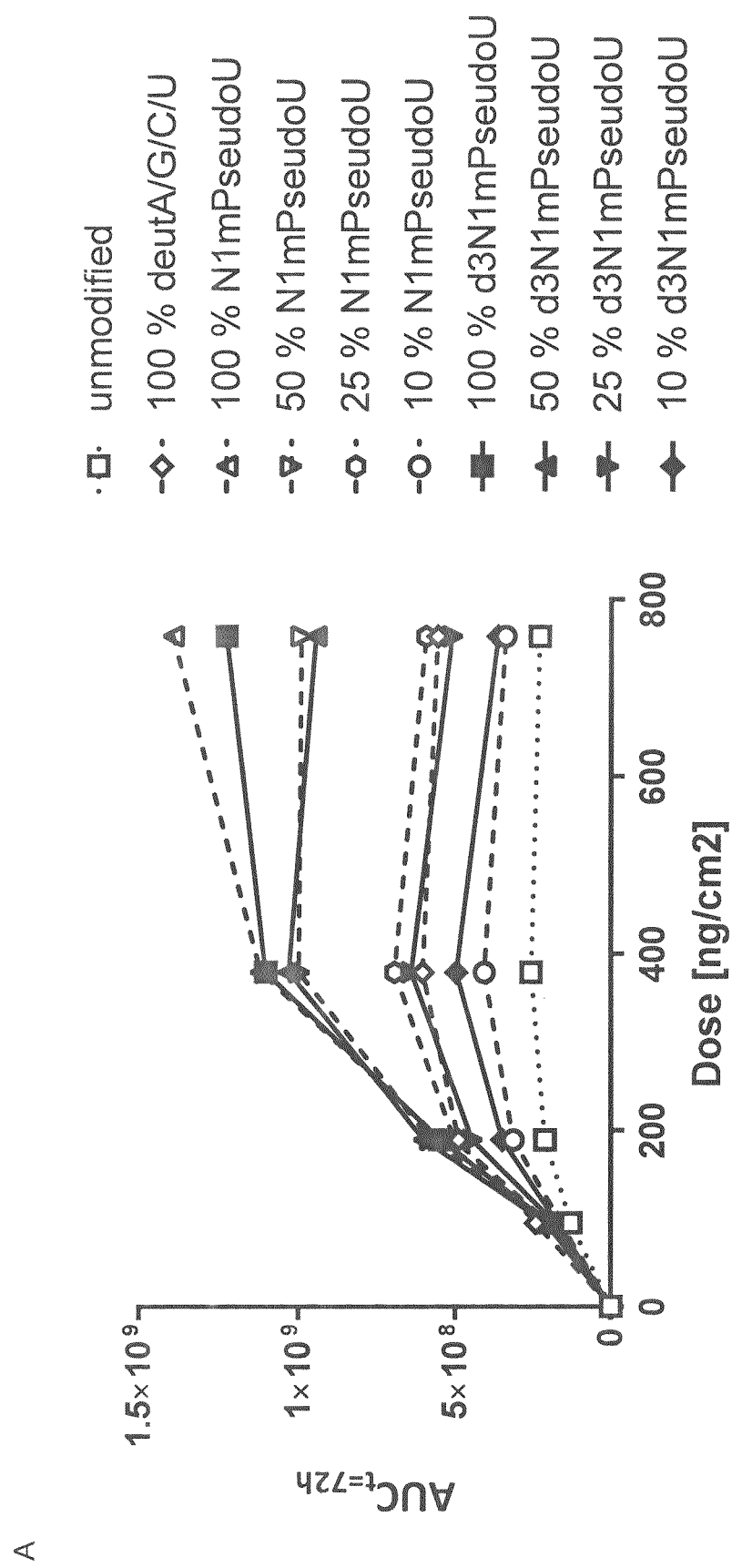
Figure 3:
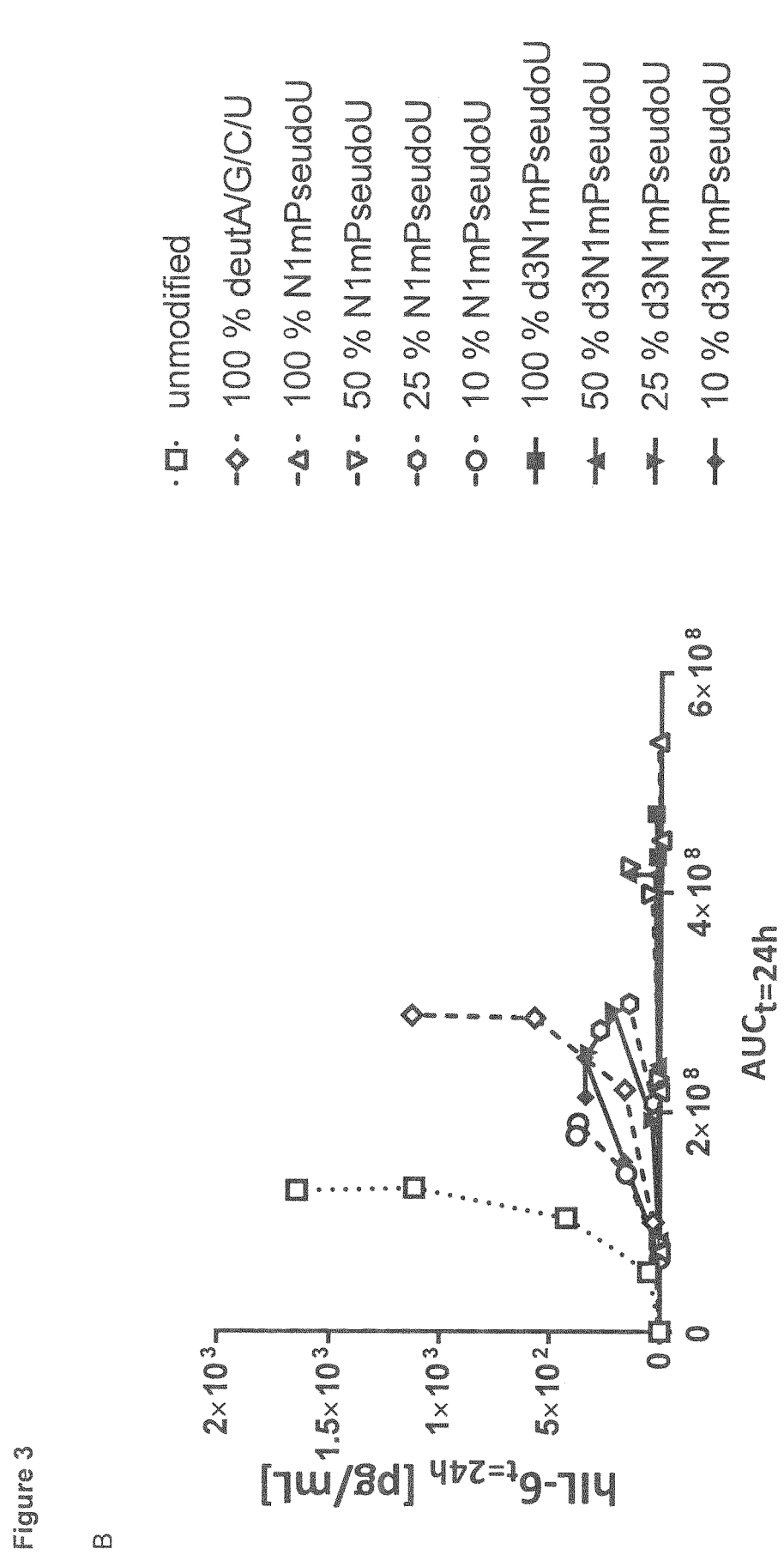
Figure 3:
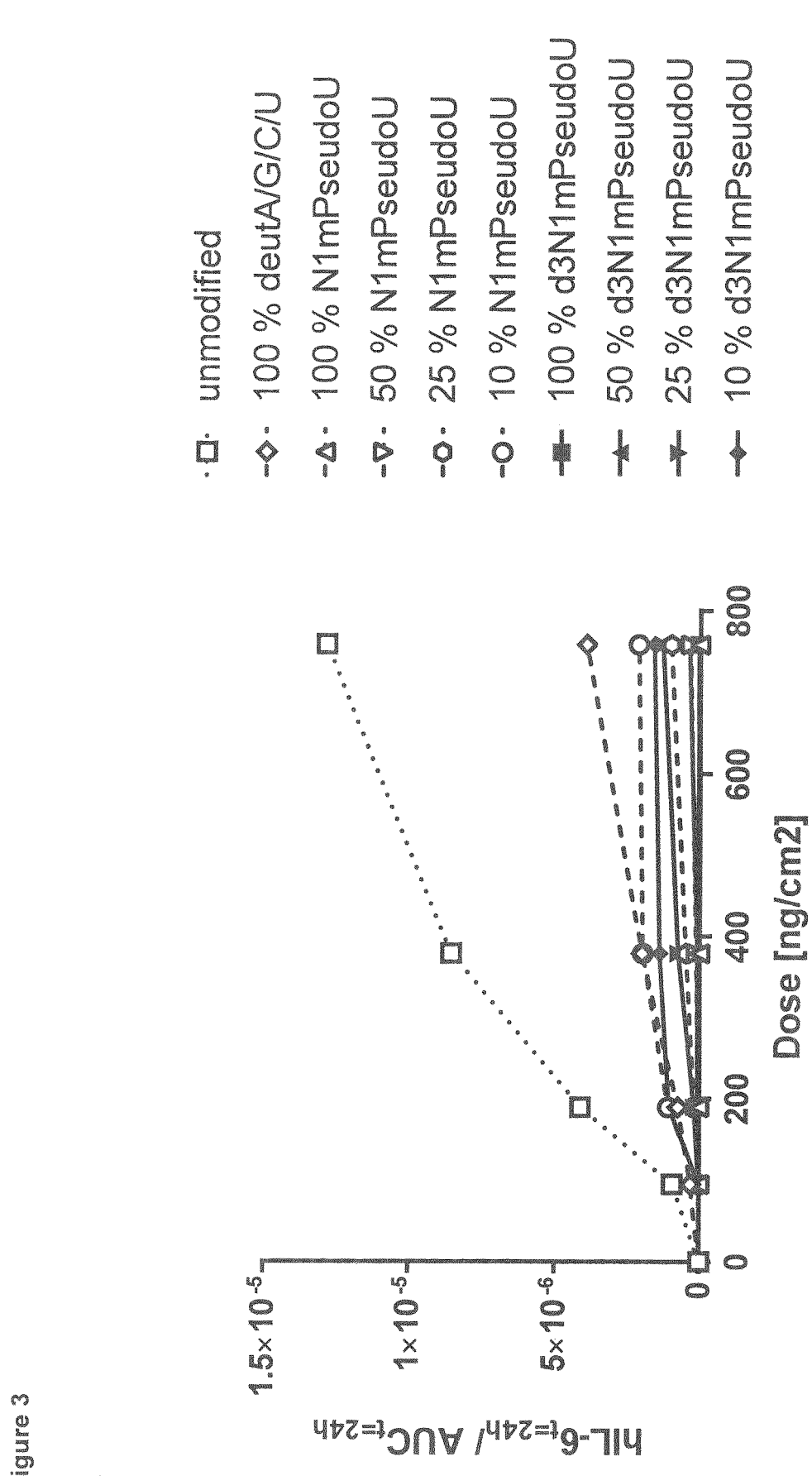

FIG. 3: Comparison of translation kinetic and hIL-6 cytokine induction of luciferase encoding polyribonucleotides containing N1 mipU and deutN1 mipU nucleotides. Panel A shows AUCt=72 h, calculated based on luciferase activity versus time, vs. dose, calculated by polyribonucleotide amount per 96-well [$cm^2$]; panel B hIL-6t=24 h vs. AUCt=24 h, calculated based on luciferase activity versus time; and panel C hIL-6t=24 h/AUCt=24 h vs. dose.

Figure 4:
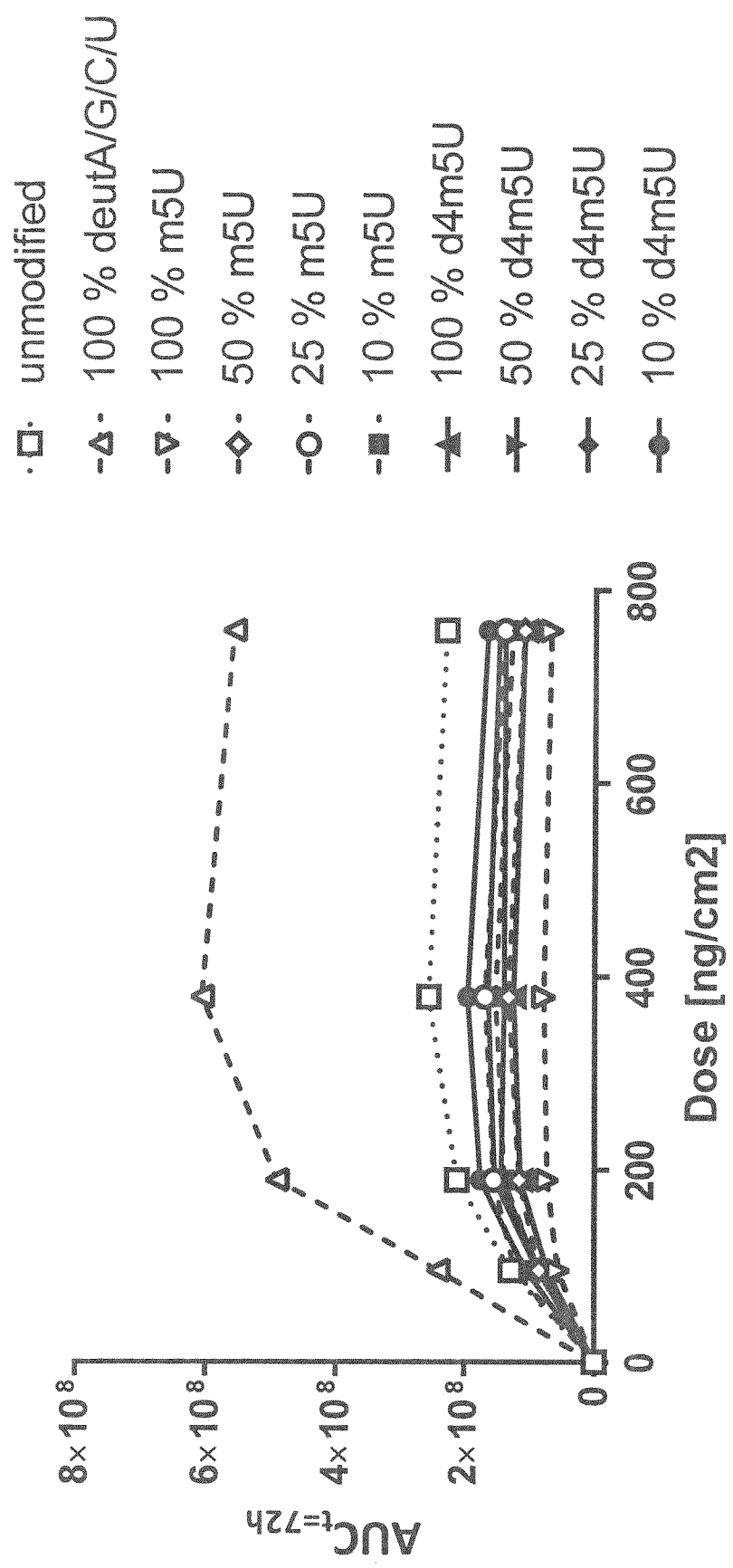
Figure 4:
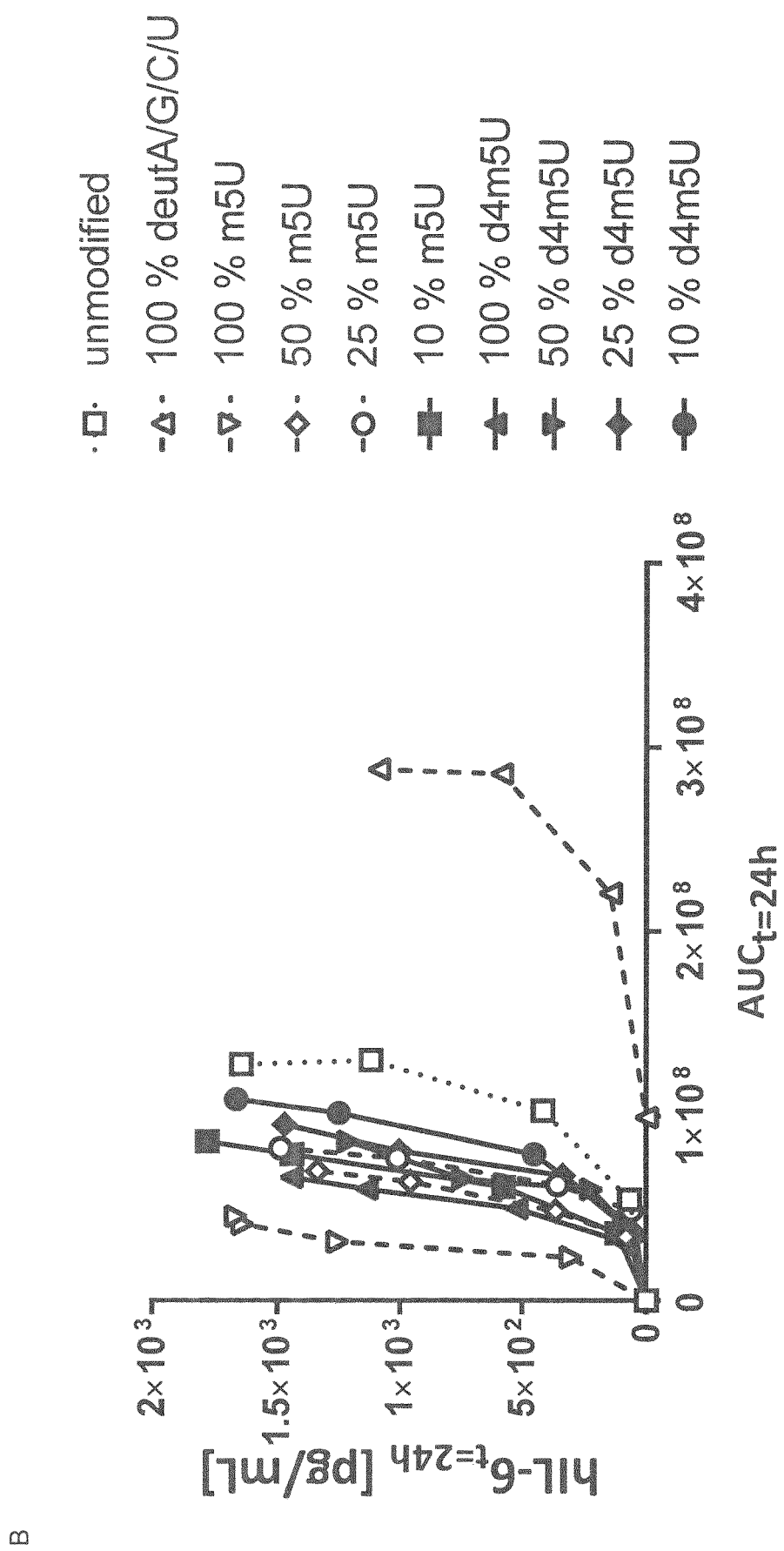
Figure 4:
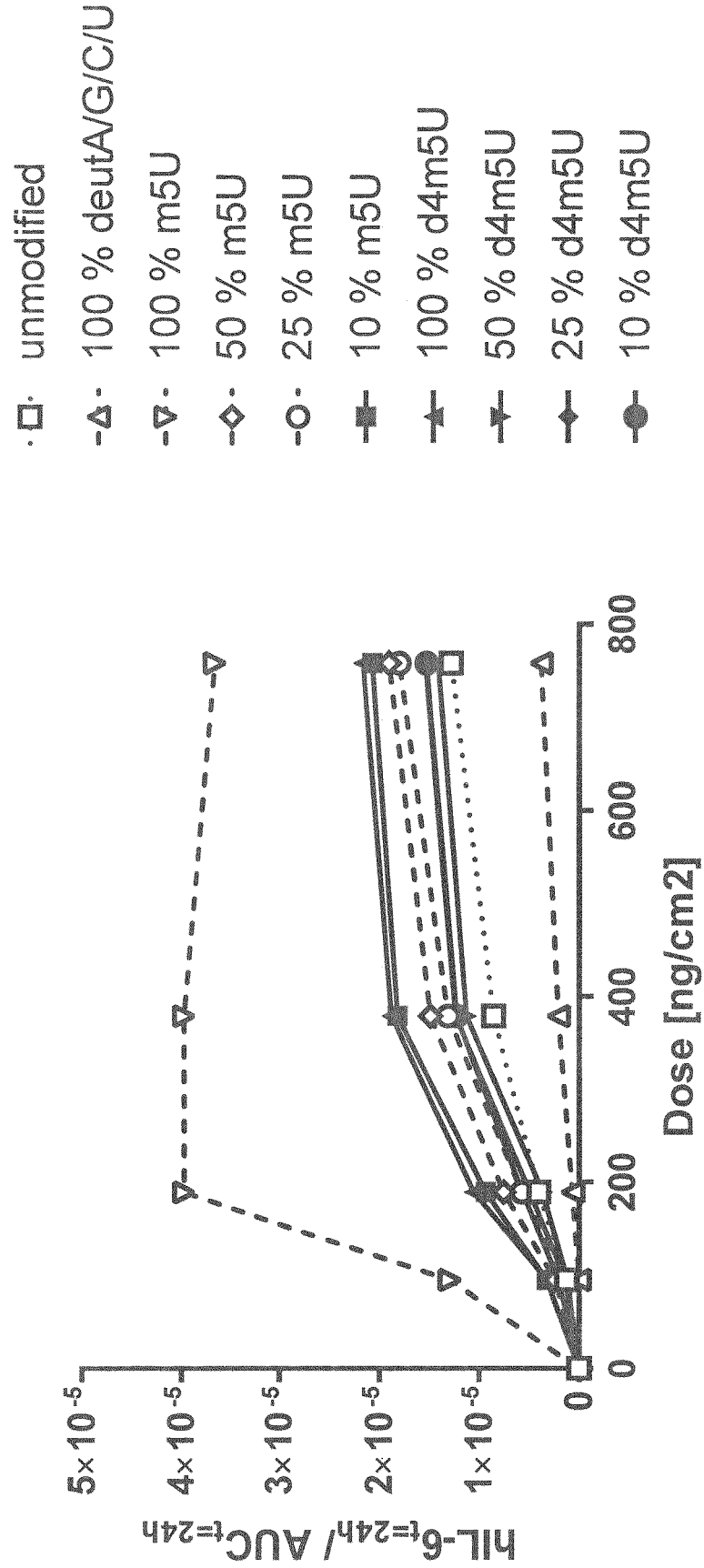

FIG. 4: Comparison of translation kinetic and hIL-6 cytokine induction of luciferase encoding polyribonucleotides containing m5U and deut(m5U) nucleotides. Panel A shows AUCt=72 h, calculated based on luciferase activity versus time, vs. dose, calculated by polyribonucleotides amount per 96-well [$cm^2$]; panel B hIL-6t=24 h vs. AUCt=24 h, calculated based on luciferase activity versus time; and panel C hIL-6t=24 h/AUCt=24 h vs. dose.

Figure 5:
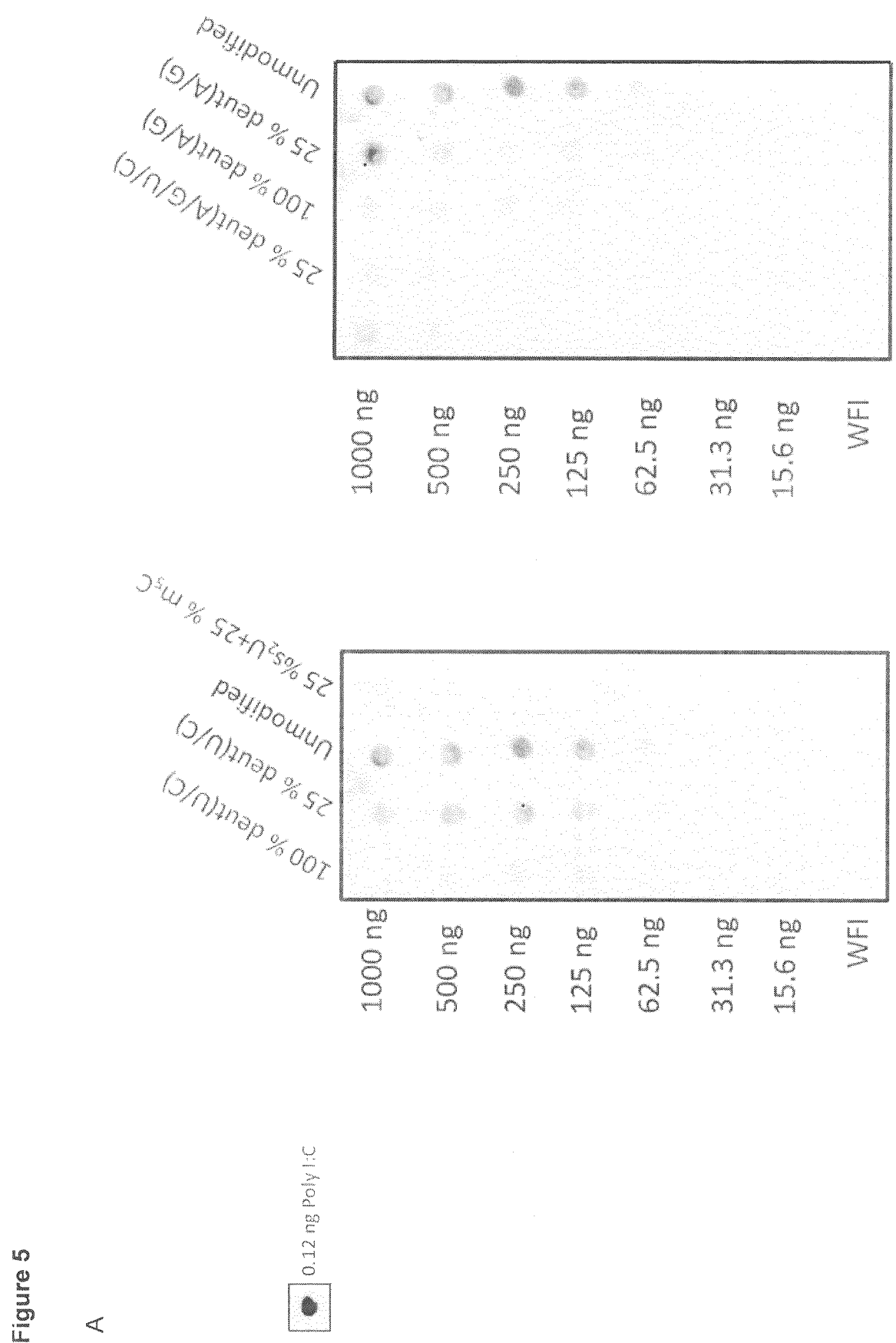
Figure 5:
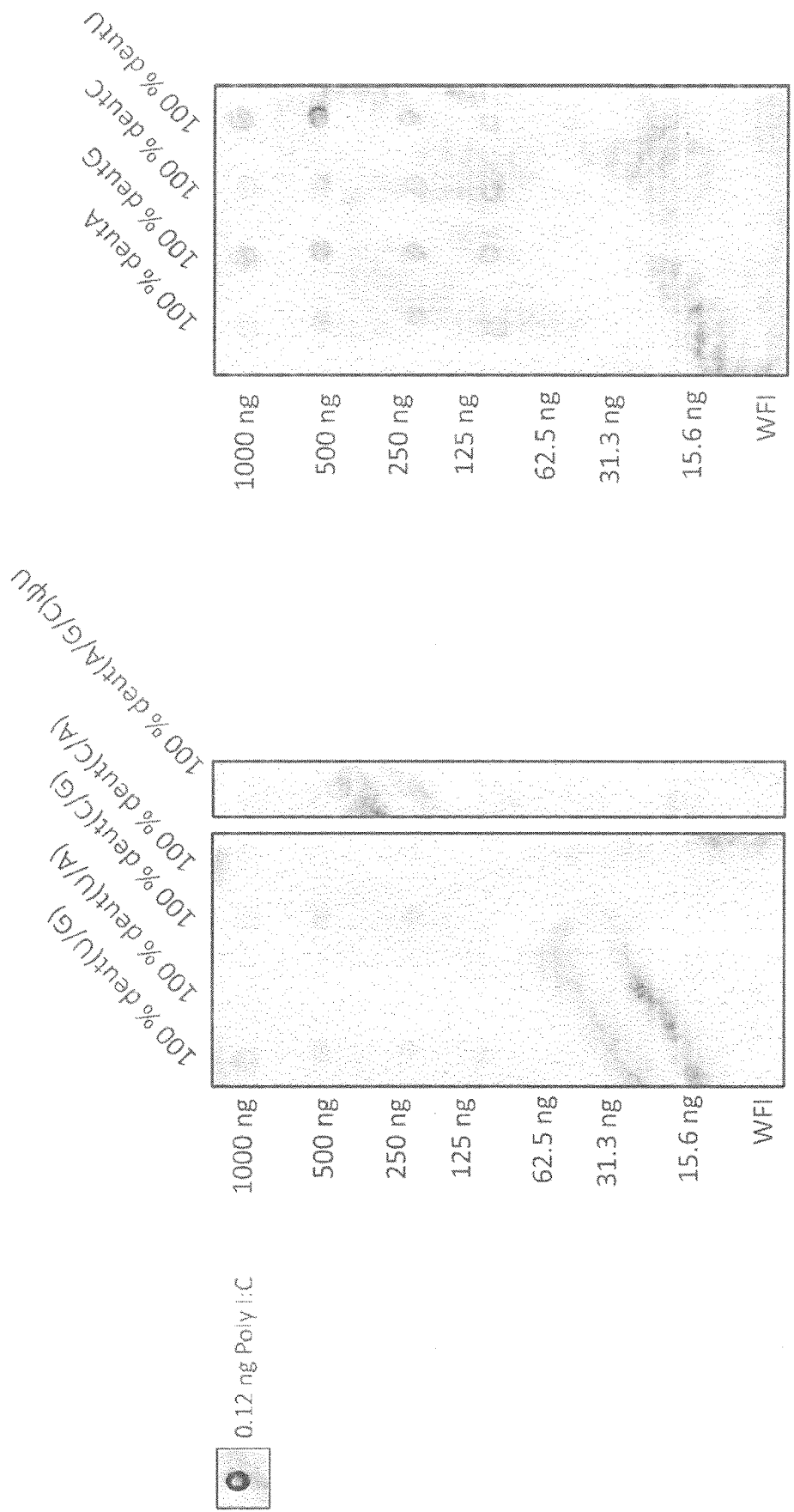

FIG. 5: Dot Blot of LUC encoding polyribonucleotides containing non-deuterated and deuterated nucleotides. Different amounts of HMW Poly(I:C) and polyribonucleotides encoding LUC polyribonucleotides were spotted onto a Nytran SuPerCharge blotting membrane and analyzed with the specific J2 mouse anti-dsRNA antibody. HMW Poly(I:C) served as positive control.

Figure 6:
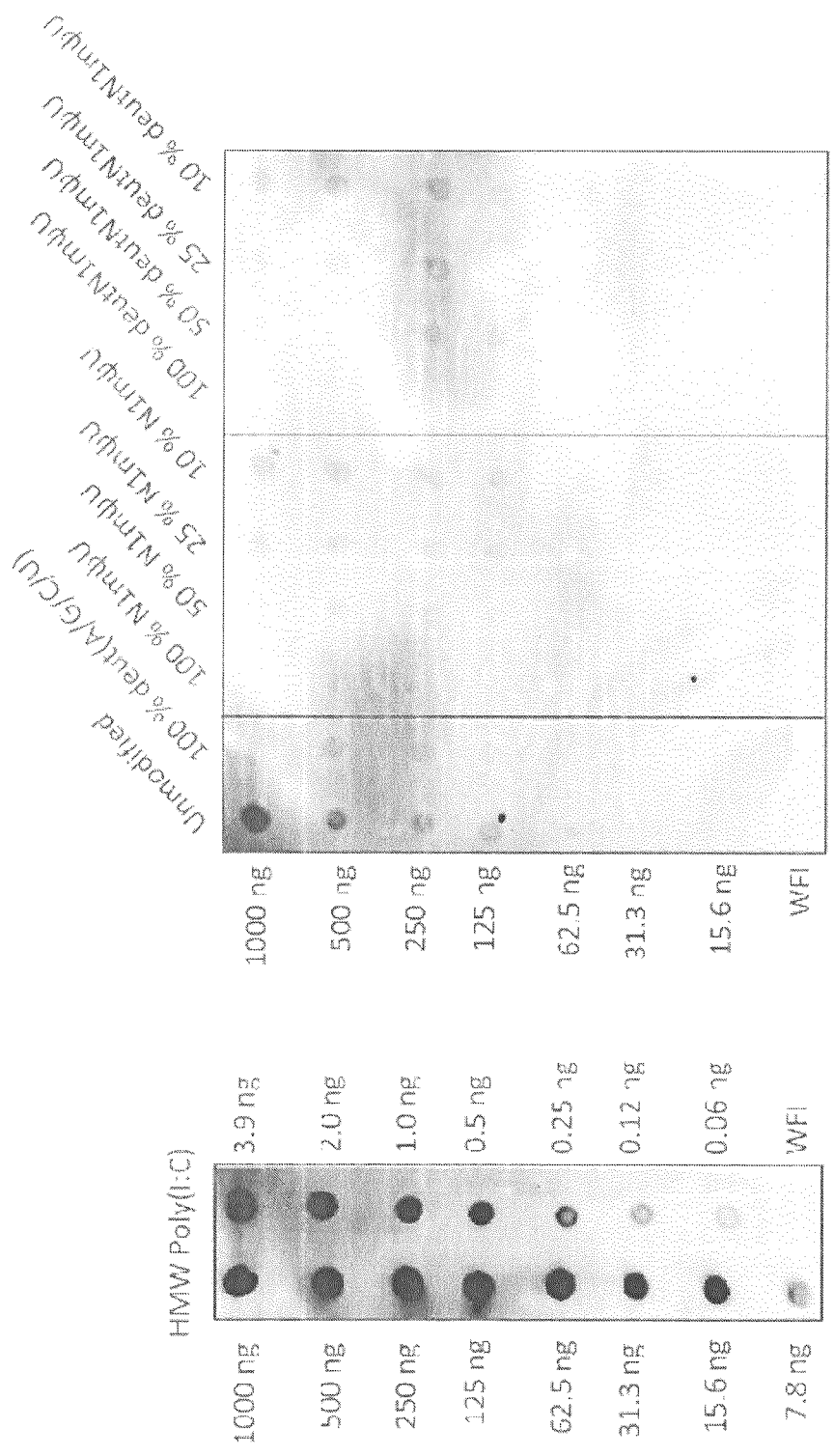
Figure 6:
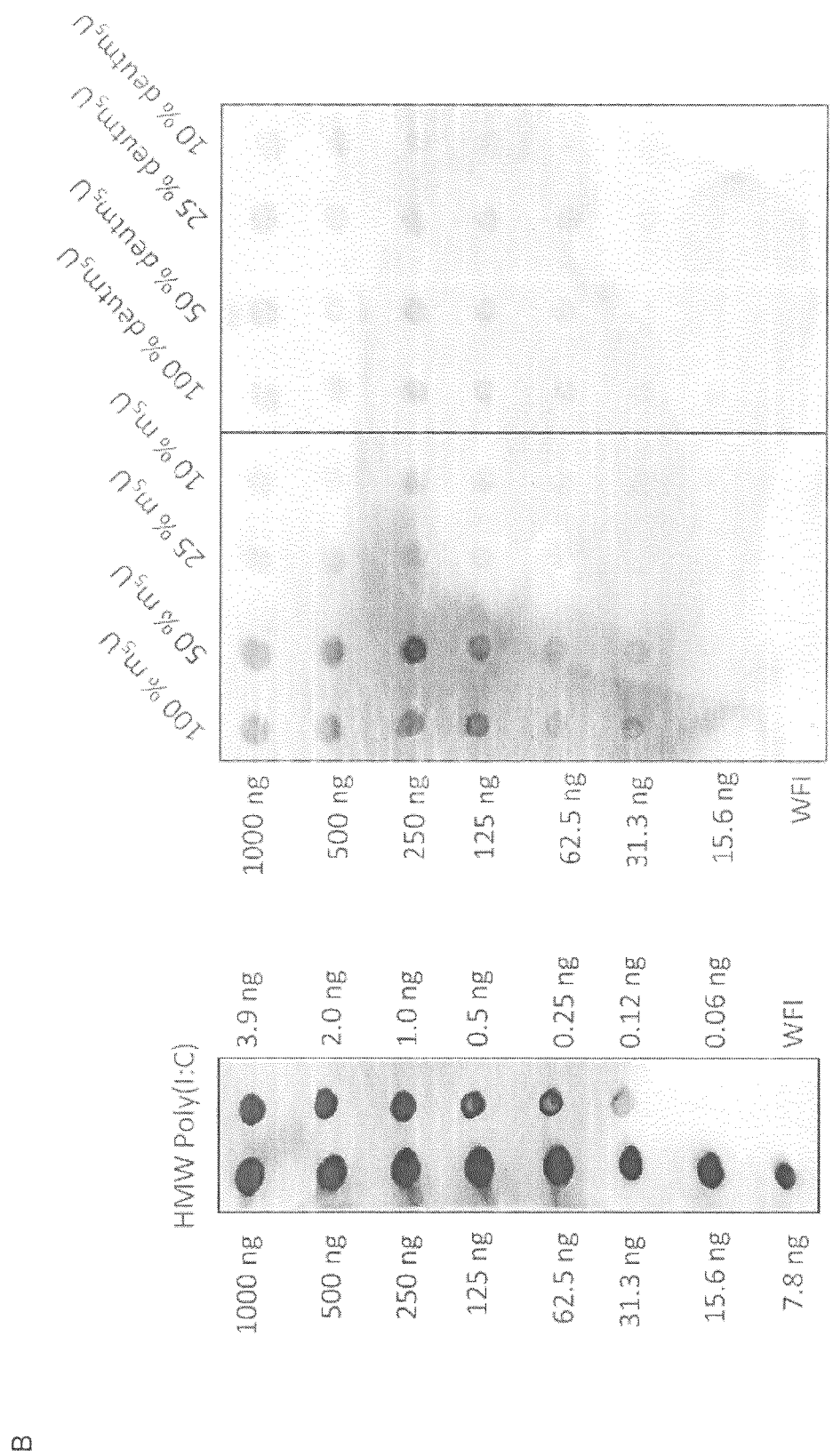

FIG. 6: Dot Blot of N1mψU, deut(N1mψU), m5U, and deut(m5U) containing LUC polyribonucleotides. Different amounts of HMW Poly(I:C) and polyribonucleotides encoding (A) non-modified, 100% deut(A/G/C/U) and N1mψU vs. deutN1mψU containing LUC polyribonucleotides, and (B) m5U vs. deutm5U containing LUC polyribonucleotides were spotted onto a Nytran SuPerCharge blotting membrane and analysed with the specific J2 mouse anti-dsRNA antibody. HMW Poly(I:C) served as positive control.

Figure 7:
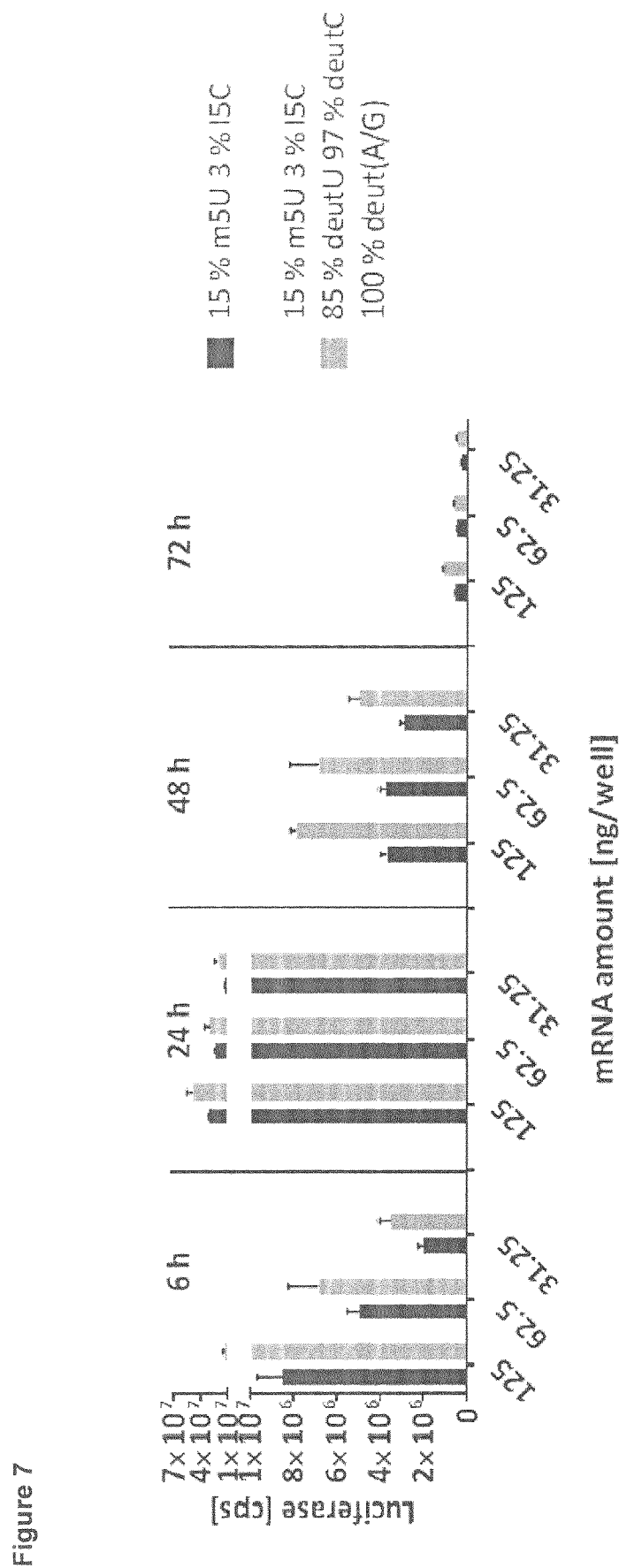

FIG. 7: Comparison of luciferase activity of polyribonucleotides containing either modified or modified deuterated nucleotides (deut). A549 cells were transfected with 125 ng/62.5 ng/31.25 ng luciferase encoding polyribonucleotides (mRNA amount [ng/well]). Luciferase encoding polyribonucleotides contained either modified (15% m5U, 3% I5C; black), or modified (15% m5U, 3% I5C) and deuterated (85% deut(U), 97% deut(C), 100% A, 100% G) nucleotides (grey). Absolute values of luciferase activity are shown as counts per second (cps) for different time points after transfection (6 h, 24 h, 48 h, 72 h).

Figure 8:
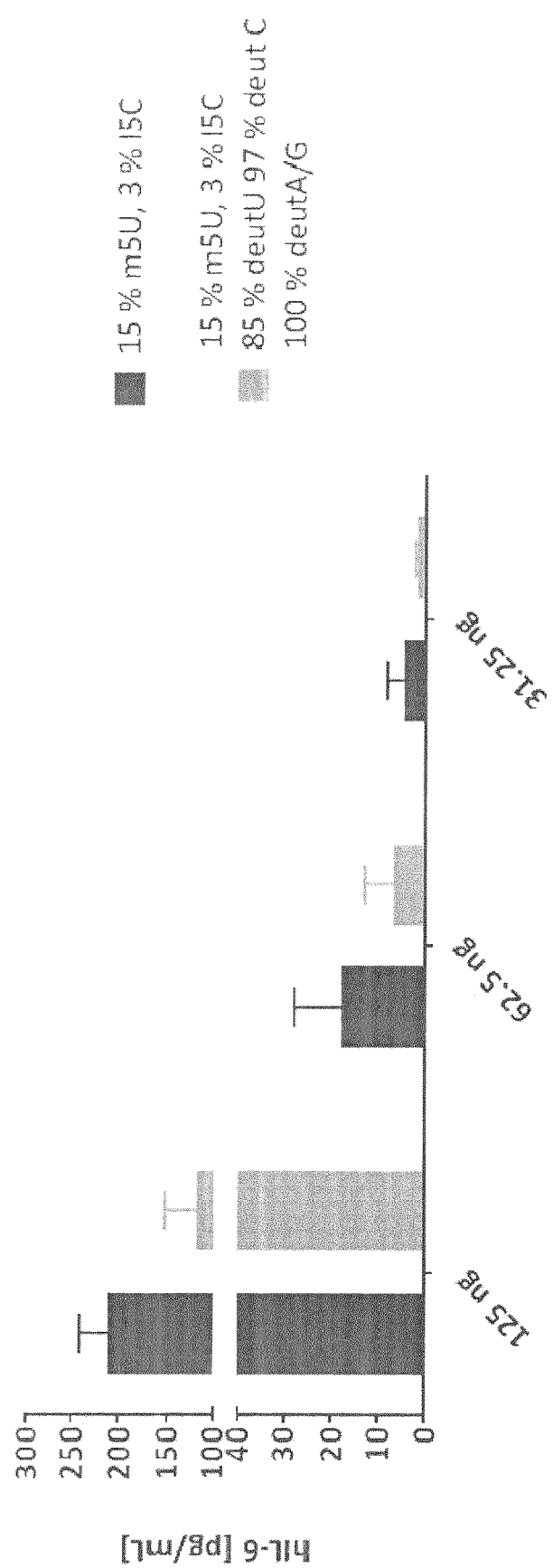

FIG. 8: Comparison of hIL-6 response of luciferase encoding polyribonucleotides containing either modified or modified deuterated nucleotides. A549 cells were transfected with 125 ng/62.5 ng/31.25 ng luciferase encoding polyribonucleotides (mRNA amount is shown in ng per well). Luciferase encoding polyribonucleotides contained either modified (15% m5U, 3% I5C; black), or modified (15% m5U, 3% I5C) and deuterated (85% deut(U), 97% deut(C), 100% A, 100% G) nucleotides (grey). hIL-6 measurement in A549 cell supernatants was done by ELISA 24 h post transfection. Absolute values of hIL-6 are shown as pg/mL. Standard deviations were calculated from triplicates.

Figure 9:
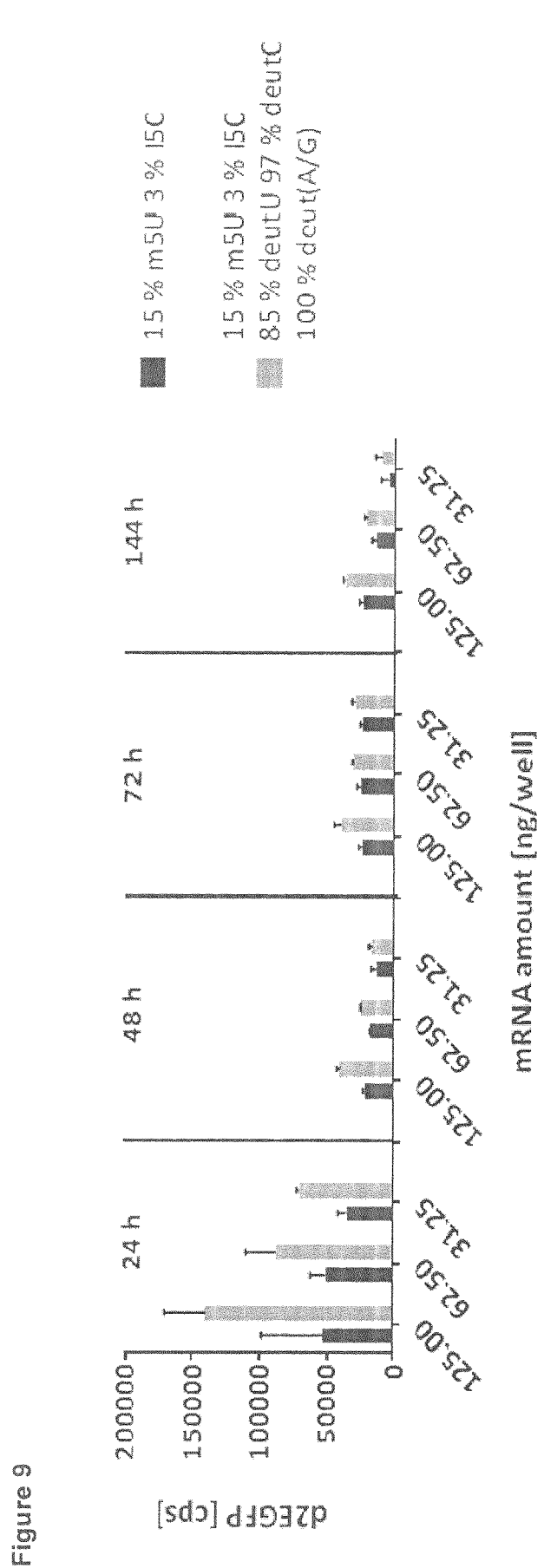

FIG. 9: Comparison of d2EGFP fluorescence of polyribonucleotides containing either modified or modified deuterated nucleotides. A549 cells were transfected with 125 ng/62.5 ng/31.25 ng d2EGFP encoding polyribonucleotides (mRNA amount [ng/well]). d2EGFP encoding polyribonucleotides contained either modified (15% m5U, 3% I5C; black), or modified (15% m5U, 3% I5C) and deuterated (85% deut(U), 97% deut(C), 100% A, 100% G) nucleotides (grey). Absolute values of d2EGFP fluorescence are shown as counts per second (cps) for different time points after transfection (24 h, 48 h, 72 h, 144 h).

Other aspects and advantages of the invention will be described in the following examples, which are given for purposes of illustration and not by way of limitation.

Each publication, patent, patent application or other document cited in this application is hereby incorporated by reference in its entirety.

EXAMPLES

Methods and materials are described herein for use in the present disclosure; other, suitable methods and materials known in the art can also be used. The materials, methods, and examples are illustrative only and not intended to be limiting.

Abbreviations used herein and their respective descriptions are listed in Table 7.

TABLE 7

| Abbreviation | Description |
|---|---|
| ° C. | Degree Celsius |
| C or Conc. | Concentration |
| ATP | Adenosin-5'-triphosphate |
| cps | Counts per second |
| CTP | Cytidine-5'-triphosphate |
| D$_2$O | Deuterium oxide |
| d2EGFP | Destabilized EGFP |
| Deut(N1mψU) | Deuterated N1-methyl-pseudo-uridine |
| Deut(N1mψUTP) | Deuterated N1-methyl-pseudo-Uridine-5'-triphosphate |
| Deut(m5U) | Deuterated 5-methyl-uridine |
| Deut(m5UTP) | Deuterated 5-methyl-Uridine-5'-triphosphate |
| Deut(A) | Deuterated adenosine (adenosine-2, 8-d2, 1', 2', 3', 4', 5', 5'-d6) |
| Deut(ATP) | Deuterated Adenosin-5'-triphosphate (ATP-2, 8-d2, 1', 2', 3', 4', 5', 5'-d6) |
| Deut(C) | Deuterated cytidine (cytidine-5, 6-d2, 1', 2', 3', 4', 5', 5'-d6) |
| Deut(CTP) | Deuterated Cytidine-5'-triphosphate (CTP-5, 6-d2, 1', 2', 3', 4', 5', 5'-d6) |
| Deut(G) | Deuterated guanosine (guanosine-8-d, 1', 2', 3', 4', 5', 5'-d6) |
| Deut(GTP) | Deuterated Guanosine-5'-triphosphate (GTP-8-d, 1', 2', 3', 4', 5', 5'-d6) |
| Deut(U) | Deuterated uridine (uridine-5, 6-d2,1', 2', 3', 4', 5', 5'-d6) |
| Deut(UTP) | Deuterated Uridine-5'-triphosphate (UTP-5, 6-d2, 1', 2', 3', 4', 5', 5'-d6) |
| DeutX (dX) | Deuterated at position X |
| DSMZ | Deutsche Sammlung von Mikroorganismen und Zellkulturen |
| EGFP | Enhanced Green Fluorescent Protein |
| ELISA | Enzyme-linked Immunosorbent Assay |
| FA | Fragment Analyzer |
| GTP | Guanosine-5'-triphosphate |
| h | Hour(s) |
| hIL-6 | Human interleukin 6 |
| I$_5$C | 5-Iodo-cytidine |
| I$_5$CTP | 5-Iodo-Cytidine-5'-triphosphate |
| LUC | Luciferase |
| m$_5$U | 5-Methyl-uridine |
| m$_5$UTP | 5-Methyl-Uridine-5'-triphosphate |
| min | Minutes |
| MW | Molecular weight |
| N1mψU | N1-methyl-pseudo-uridine |
| N1mψUTP | N1-methyl-pseudo-Uridine-5'-triphosphate |
| n/a | Not applicable |
| ND | NanoDrop |
| NH$_4$OAc | Ammonium acetate |
| o/n | Over night |
| nm | Nanometer |
| nt | Nucleotides |
| P/S | Penicillin/Streptomycin |
| pg | Pico gram |
| rpm | Rotation per minute |
| RT | Room temperature |
| T | Transcript |
| UTP | Uridine-5'-triphosphate |
| UT | Untransfected |
| w/o | Without |
| w/V | Weight/volume |
| WFI | Water for injection |
| % | Percent |

Deuterated and/or non-deuterated nucleotides tested are listed in Table 8. Structural formulars of the respective nucleotides are shown in FIG. 1.

TABLE 8

Deuterated vs. non-deuterated nucleotides

ATP, GTP, CTP, UTP
N1mψUTP
m$_5$UTP

Material and Methods

Materials, Devices, Software, and Test System Used

Materials are listed in Table 9.

TABLE 9

| Material | Supplier | Cat# |
|---|---|---|
| deutA (ATP-2,8-d2, 1',2',3',4',5',5'-d6) 100 mM solution | Sigma Aldrich | 738034 |
| deutG (GTP-8-d, 1',2',3',4',5',5'-d6) 100 mM solution | Sigma Aldrich | 738069 |
| deutC (CTP-5, 6-d2,1',2',3',4',5',5'-d6) 100 mM solution | Sigma Aldrich | 738042 |
| deutU (UTP-5, 6-d2,1',2',3',4',5',5'-d6) 100 mM solution | Sigma Aldrich | 738050 |
| N1-Methyl-Pseudo-UTP | Jena Biosciences | NU-890-CSTM |
| Deut(N1m ψUTP) | Jena Biosciences | n/a (custom synthesis) |
| 5-Methyl-UTP | Jena Biosciences | NU-880-CSTM |
| I$_5$CTP 100 mM solution | Jena Biosciences | NU-139-CSTM |
| Deut(m5UTP) | Jena Biosciences | n/a (custom synthesis) |
| rATP 100 mM solution | Jena Biosciences | NU-1010 |
| rGTP 100 mM solution | Jena Biosciences | NU-1012 |
| rCTP 100 mM solution | Jena Biosciences | NU-1011 |
| rUTP 100 mM solution | Jena Biosciences | NU-1013 |
| ARCA 100 mM solution | Jena Biosciences | NU-855-cstm |
| Transcription buffer III [X] | Ethris | n/a (RNA-00044, RNA-0105) |
| RiboLock Rnase Inhibitor 40 U/μL | Thermo Fisher Scientific | EO038AFB001 |
| Inorganic Pyrophosphatase 1 U/μL | Thermo Fisher Scientific | EFO22B019 |
| T7 RNA Polymerase 100 U/μL | Thermo Fisher Scientific | EP0113B015 |
| DNAse I (Rnase-free) 1 U/μL | Thermo Fisher Scientific | EN052B009; EN052RAFB001 |
| WFI | B. Braun | 370 3444 |
| Deuterium oxide | Aldrich | 453366-0.5 mL |
| Ethanol 99% | Carl Roth | 5054.3 |
| Ammoniumacetate-solution 5M | Sigma Aldrich | 09691-1L |
| Standard Sensitivity RNA Analysis Kit (15 nt) | Advanced Analytical | DNF-471 |
| Capillary Storage Solution | Advanced Analytical | GP-440-0100 |
| Intercalating Dye | Advanced Analytical | DNF-600-U030 |
| 5× 930 dsDNA Inlet Buffer | Advanced Analytical | DNF-355-0125 |
| 5× Capillary Conditioning Solution | Advanced Analytical | DNF-475-0050 |
| BF-25 Blank Solution | Advanced Analytical | DNF-300-0008 |
| Standard Sense RNA Ladder | Advanced Analytical | DNF-382-U020 |
| Standard Sense RNA Diluent Marker (15 nt) | Advanced Analytical | DNF-369-0004 |
| RNA separation Gel | Advanced Analytical | DNF265-0240 |
| 0.25X TE Rinse Buffer | Advanced Analytical | DNF-497-0215 |
| MEM, GlutaMAX™ Supplement | Gibco | 41090-028 |
| Penicillin-Streptomycin (10,000 U/mL) | Gibco | 15140-122 |
| Fetal Bovine Serum (HI-FBS) | Gibco | 10270-106 |
| DPBS, no calcium, no magnesium | Gibco | 14190-094 |
| Trypsin-EDTA (0.05%) | Gibco | 25300-054 |
| Lipofectamine® MessengerMAX™ | Gibco | LPOLYRIBO-NUCLEOTIDE001 |
| Tris-HCl | Carl Roth | AE15.3 |
| TritonX-100 | Sigma-Aldrich | T9284-100ML |
| Magnesiumcarbonat | Carl Roth | 3530.2 |
| Magnesiumsulfat-Heptahydrat | Carl Roth | T888.1 |
| Tricine | Carl Roth | 6977.4 |
| Ethylendiamin-tetraessigsäure Dinatriumsalz Dihydrat | Carl Roth | X986.1 |
| Adenosine-5'-triphosphate disodium salt hydrate | Sigma Aldrich | A6419 |
| Coenzyme A trilithium salt | Sigma Aldrich | C3019 |
| 1,4-Dithiothreit | Carl Roth | 6908.2 |
| D-Luciferin free acid 99% | Synchem | S039 |
| 96 Well White Flat Bottom Polystyrene Not Treated Microplate | Costar | 3912 |
| Quantikine ELISA Human IL-6 kit | R&D systems | D6050 |
| Poly(I:C) | Invivogen | TLRL-PICW |
| NytranSuper Charged Blotting Membrane | GE Healthcare | 10416216 |
| 10× TBS | Bio-Rad | 170-6435 |
| Tween20 | Sigma | P1379-100 mL |
| Milk powder | Carl Roth | T145.2 |
| Cell culture dishes | Corning | n/a |
| Monoclonal Antibody J2 Anti-dsRNA | English & Scientific Consulting Kft. | n/a |
| goat anti-mouse HRP-conjugated antibody | Santa Cruz Biotechnology, Inc. | sc-2005 |
| Luminata™ Western HRP Chemiluminescence Substrates Crescendo | Millipore | WBLUR0500 |
| TPP® plates | R&D Systems | 890045 |
| Lipoplex solution | ThermoFisher Scientific | LMRNA001 |
| Calibrator Diluent RD5T | R&D Systems | 895175 |
| Wash Buffer | R&D Systems | n/a |
| Wash Buffer Concentrate | R&D Systems | 895003 |
| Assay Diluent RD1W | R&D Systems | 895117 |
| Color Reagent A | R&D Systems | 895000 |
| Color Reagent B | R&D Systems | 895001 |

Devices are listed in Table 10.

TABLE 10

| Device | Supplier |
|---|---|
| Thermomixer C® | Eppendorf |
| Axiovert25 | Zeiss |
| NanoDrop2000 (ND) | Thermo Scientific |
| Fragment Analyzer (FA) | Advanced Analytical |
| Infinite M200 PRO Microplate Reader | Tecan |
| ChemiDoc XRS+ | Bio-Rad |
| Centrifuge 5810 R | Eppendorf |
| Countess Cell Counting Device C10281 | Life technologies |
| Wallac Victor$^2$ 1420 Multilabel reader | PerkinElmer Life Sciences |

Software is listed in Table 11.

TABLE 11

| Software | Provider |
|---|---|
| Prism6 for Windows, Version 6.07 Jun. 12, 2015 | GraphPad Software, Inc. |
| Image Lab, Version 5.2 build 8 Feb. 3, 2014 | Bio-Rad Laboratories 5.2 build 8 Feb. 3, 2014 |
| Excel 2010/2013/2016 | Microsoft |
| i-control 1.11 (for infinite reader) | Tecan |
| Wallac 1420 Software Version 2.00 release 9 | PerkinElmer Life Sciences |
| ProSize 3.0 | Advanced Analytical |

The test system is listed in Table 12.

TABLE 12

| Test System | Species | Strain |
|---|---|---|
| Cell line | Human | A549 (lung adenocarcinoma epithelial cell line) |
| Thawed passage no. | Used passage no. | Supplier |
| Passage 5 | p5 + 12 | DSMZ; ACC 107; n/a |

Buffers Used (i) Luciferase Assay Buffer

All substances for 1 L luciferase buffer and buffer preparation procedure are shown in Table 13. Buffer was finally stored at −20° C., light protected.

TABLE 13

| Substance/Procedure | MW [g/mol] | $C_{final}$ [mM] | Amount |
|---|---|---|---|
| Weigh magnesium carbonate | 485.7 | 1.0 | 486 mg |
| Weigh Magnesium sulfate - hepta - hydrate | 246.5 | 2.7 | 666 mg |
| Weigh Tricine | 179.2 | 20 | 3584 mg |
| Weigh Ethylenediaminetetraacetic acid disodium salt di-hydrate | 372.2 | 0.1 | 37 mg |
| Weigh Adenosine-5'-triphosphat 5'-triphosphate disodium salt hydrate | 551.1 | 0.53 | 292 mg |
| Weigh Coenzyme A trilithium salt | 785.3 | 0.27 | 212 mg |
| Weigh 1.4-Dithiothreit | 154.2 | 33.3 | 5135 mg |
| Weigh D-Luciferin free acid 99% | 280.3 | 0.47 | 132 mg |
| Fill up with WFI | | | Fill up to 1 L |

(ii) Lysis Buffer

All substances for 200 mL 10× lysis buffer and buffer preparation procedure are shown in Table 14. Buffer was stored at RT. For direct use, 10× lysis buffer was diluted to 1× in WFI.

TABLE 14

| Substance/Procedure | MW [g/mol] | $C_{final}$ | Amount |
|---|---|---|---|
| Weigh Tris-HCl | 157.6 | 250 mM | 7.88 g |
| Fill up with WFI | | | Fill up to 150 mL |
| Adjust pH to 7.8 with 5M NaOH | | | |
| Add TritonX-100 | | 1% | 2 mL |
| Fill up with WFI | | | Fill up to 200 mL |

Production of Test and Reference Items

All reference and test items (see Table 15) were produced using a linearized luciferase and poly(A) tail encoding template in to a standard T7 in vitro transcription protocol with an ARCA cap. In these reactions non-deuterated non-modified and modified NTPs were partly or completely replaced by their deuterated counterparts. Test items were purified by a standard precipitation process, subsequently dissolved either in deuterium oxide (all polyribonucleotides according to the present invention containing deuterated nucleotides) or WFI (all polyribonucleotides comprising a sequence which encodes a protein and containing no deuterated nucleotides) and stored at −80° C.

TABLE 15

| Test/Reference item | Modification/Combinations | Test/Reference item | Modification/Combinations |
|---|---|---|---|
| Reference | Non-modified | Test | 100% N1mψU |
| Test | 25% s₂U + 25% m₅C | Test | 50% N1mψU |
| Test | 100% deut(U/C) | Test | 25% N1mψU |
| Test | 25% deut(U/C) | Test | 10% N1mψU |
| Test | 100% deut(U/G) | Test | 100% deut(N1mψU) |
| Test | 100% deut(U/A) | Test | 50% deut(N1mψU) |
| Test | 100% deut(C/G) | Test | 25% deut(N1mψU) |
| Test | 100% deut(C/A) | Test | 10% deut(N1mψU) |
| Test | 100% deut(A) | Test | 100% m₅U |
| Test | 100% deut(G) | Test | 50% m₅U |
| Test | 100% deut(C) | Test | 25% m₅U |
| Test | 100% deut(U) | Test | 10% m₅U |
| Test | 100% deut(A/G/C/U) | Test | 100% deut(m₅U) |
| Test | 25% deut(A/G/C/U) | Test | 50% deut(m₅U) |
| | | Test | 25% deut(m₅U) |
| | | Test | 10% deut(m₅U) |

Polyribonucleotide Analysis by Fragment Analyzer (FA)

All reference and test polyribonucleotides comprising a sequence which encodes a protein were analyzed in terms of size and smear by FA. 2 μL (c(polyribonucleotide)=0.05 mg/mL) polyribonucleotide were analyzed in 24 μL final volume of kit specific sample dilution buffer under denaturation conditions. Further sample preparation and running conditions were performed according to the instructor's manual "Standard Sensitivity RNA Analysis Kit (15 nt)".

Cell Seeding and Transfection

For transfection, 20,000 A549 cells per well were seeded in a 96 well plate. 24 h post seeding, transfection of A549 cells using Lipofectamine™ MessengerMAX™ transfection reagent was done. Briefly, the cell culture medium was changed and the cells were transfected with mRNA using Lipofectamine® MessengerMAX™ in a 1:1.5 ratio (w RNA/v Lipofectamine® MessengerMAX™). For transfection, the mRNA was diluted in D₂O (total volume 72 μL). Lipofectamine® MessengerMAX™ was diluted in medium w/o serum and w/o P/S (total volume 432 μL) and mixed by pipetting. After incubation for 10 min at RT, the Lipofectamine® MessengerMAX™ solution was divided on six tubes (one tube for each mRNA). An equal volume of each mRNA solution was added to one tube Lipofectamine® MessengerMAX™ solution and incubated for another 5 min at RT before performing a 1:2 dilution in medium w/o serum and w/o P/S. 25 μL of the required lipoplex solution was transferred to the cells containing 100 μL normal growth medium. The polyribonucleotide amounts of 62.5 ng/well and 31.25 ng/well were tested in triplicates for each test and reference polyribonucleotide. For kinetic analysis, the luciferase activity was measured 6 h, 24 h, 48 h and 72 h post transfection.

Translation Kinetic and Human Interleukin-6 (hIL-6) Cytokine Induction of Luciferase Encoding Polyribonucleotide Here, the influence of deuterated vs. non-deuterated nucleotides and deuterated vs. non-deuterated N1mψU and m₅UTP nucleotides (FIG. 1) was analyzed regarding translation kinetic of the luciferase reporter gene encoding polyribonucleotide and immunogenicity. Therefore, translation kinetics and hIL-6 response of different partial- and fully-deuterated, and different partial- and fully-deuterated N1mψU- and m₅U-modified luciferase encoding polyribonucleotides were examined compared to non-deuterated non-modified, N1miψU-modified and 25% 5-Methylcytidine/25% 2-Thiouridine modified polyribonucleotides. Luciferase activity was measured 6 h, 24 h, 48 h and 72 h post polyribonucleotide transfection and hIL-6 ELISA was performed 24 h post polyribonucleotide transfection.

Macroscopic Evaluation of Cell Death and Luciferase Activity Measurement

Prior to luciferase activity measurement, cell viability/cell death was macroscopically categorized according to ">20% dead cells", "<20% dead cells" and "<5% dead cells" using an Axiovert25 microscope at time point 24 h, 48 h and 72 h post transfection. For luciferase activity measurement, fresh lysates were measured at 6 h, 24 h, 48 h and 72 h post transfection using luciferase assay buffer. In detail, for each time point, cells were washed once with 200 µL PBS w/o $Mg^{2+}/Ca^{2+}$ and lysed with 100 µL 1× lysis buffer for 20 min at RT and 300 rpm. 10 µL cell lysate in lysis buffer were transferred to a 96-well white flat bottom polystyrene plate. Luciferase activity was measured at the Tecan Infinite M200 PRO Microplate Reader device using 100 µL luciferase assay buffer. The temperature was kept constant for all time points during luciferase measurement. The absolute values, the relative fold increase of luciferase activity normalized to the non-modified polyribonucleotide control, the AUCt=72 h (calculated based on luciferase activity versus time) vs. dose (i.e. the quantity of polyribonucleotide applied to the cells calculated by polyribonucleotide amount per 96-well [$cm^2$]), hIL-6t=24 h vs. AUCt=24 h (calculated based on luciferase activity versus time) and hIL-6t=24 h/AUCt=24 h vs. dose were calculated.

hIL-6 ELISA 24 h/48 h after transfection, cell culture supernatants (approximately 120 µL) were collected, transferred into a new 96-well TPP plate and stored at −80° C. until cytokine measurement. The hIL-6 ELISA was performed as described by the manufacturers protocol (Biotechne/R&D Systems). In detail, all reagents were brought to RT (20-25° C.) before use. The human IL-6 standard was reconstituted with Calibrator Diluent RD5T. The reconstitution produced a stock solution of 300 pg/mL. The 1× Wash Buffer was prepared out of the Wash Buffer Concentrate with deionized water. The standard was prepared by pipetting 667 µL of the appropriate Calibrator Diluent into the 100 pg/mL stock solution tube and 500 µL of diluent into each remaining tube). Out of the stock solution a dilution series was made (first step 1:3, remaining 1:2). The undiluted standard served as the high standard (300 pg/mL). The appropriate Calibrator Diluent served as the zero standard (0 pg/mL). The cell culture supernatant was brought to RT and centrifuged for 5 min at 1800 g at 4° C. The supernatant was diluted with the appropriate Calibrator Diluent according to the plate layout and 100 µL of Assay Diluent RD1W was added to each well. Then, 100 µL of standard, sample, or control were added per well, respectively. The plate was covered with the adhesive stripe provided and incubated for 2 h at RT. Each well was washed for four times by using 300 µL 1× Wash Buffer. 200 µL of human IL-6 conjugate were added to each well and the plate was covered with a new adhesive stripe and incubated for 2 h at RT. Afterwards, each well was washed for four times by using 300 µL 1× Wash Buffer. Substrate Solution was prepared by mixing Color Reagents A and B protected from light directly before use. 200 µL of Substrate Solution was added to each well and incubated in the dark for 20 minutes at RT. 50 µL of Stop Solution were added to each well (the color in the wells changes from blue to yellow). The optical density was determined at 450 nm within 5 min using a microplate reader. Measurement was performed with a Tecan i-control and calculated with a 4PL curve-fit using GraphPad Prism (Transform to X=IgX, Sigmoidal 4PL, X is Ig(concentration). Transform to X=10^X). Data analysis was performed with Microsoft Excel (2010/2013) and Prism6 Software.

Comparison of Translation Kinetic and hIL-6 Cytokine Induction of Luciferase Encoding Polyribonucleotide Containing Non-Deuterated and Deuterated Nucleotides As shown in FIG. 2A, luciferase activity of polyribonucleotides, wherein all nucleotides of one nucleotide type were deuterated, was higher than the luciferase activity of a non-deuterated non-modified reference polyribonucleotide for all doses in case of adenosine, guanine and cytidine, respectively (right hand side, lower panel).

Luciferase activity of polyribonucleotides, wherein all nucleotides of two nucleotide types were deuterated, was strongly enhanced compared to that of non-deuterated non-modified reference polyribonucleotides for all doses (FIG. 2A). The only exception was in case of polyribonucleotides comprising a combination of fully deuterated cytidine and guanosine residues at a dose close to 800 ng/$cm^2$.

Luciferase activity of polyribonucleotides, wherein all nucleotides of all four nucleotide types were deuterated, was comparably high as that of polyribonucleotides, wherein all adenosine-5'-triphosphat and all guanosine-5'-triphosphat residues were deuterated (FIG. 2A; right hand side, upper panel).

The percentage of deuterated nucleotide residues was positively correlated with the level of luciferase activity of said polyribonucleotides with polyribonucleotides comprising 100% of the residues of two or four nucleotide types deuterated showing a higher level of luciferase activity compared to polyribonucleotides comprising 25% of the same two or four nucleotide types deuterated (FIG. 2A; upper panel). The only exception was in case of polyribonucleotides comprising a combination of deuterated uridine and cytidine residues at a dose close to 800 ng/$cm^2$.

As shown in FIG. 2B, hIL-6 cytokine induction by polyribonucleotides, wherein all nucleotides of one nucleotide type were deuterated, was comparable to that induced by the non-deuterated non-modified reference polyribonucleotide (right hand side, lower panel).

The level of hIL-6 cytokine induction by polyribonucleotides, wherein all nucleotides of two nucleotide types were deuterated, was reduced compared to that of non-deuterated non-modified reference polyribonucleotides for all doses (FIG. 2B). Except for the combination of cytidine and uridine, the only exception was observed at doses close to 400 ng/$cm^2$ and in case of guanosine and uridine at a dose close to 200 ng/$cm^2$.

In case of 25% 5-methylcytidin/25% 2-thiouridine modified polyribonucleotides, the level of hIL-6 cytokine induction was lower than the level of hIL-6 cytokine induction of all other investigated polyribonucleotides (FIG. 2B).

hIL-6 cytokine induction by polyribonucleotides, wherein all nucleotides of all four nucleotide types were deuterated, was lower compared to that by polyribonucleotides, wherein all adenosine and all guanosine residues were deuterated (FIG. 2B; right hand side, upper panel).

The percentage of deuterated nucleotide residues was negatively correlated with the level of hIL-6 cytokine induction by said polyribonucleotides with polyribonucleotides comprising 100% of the residues of two or four nucleotide residue deuterated showing less induction of hIL-6 cytokine compared to polyribonucleotides comprising 100% of the same two or four nucleotide types deuterated (FIG. 2B; upper panel). Only polyribonucleotides comprising a combination of deuterated adenosine and uridine residues showed a comparable level of hIL-6 cytokine induction for 25% and 100% at a dose close to 400 ng/cm².

In FIG. 2C, the ratio of hIL-6 cytokine induction and luciferase activity is shown for the investigated polyribonucleotides vs. dose with low values of said ratio indicating low hIL-6 cytokine induction and/or high luciferase activity. This ratio was smaller for all investigated polyribonucleotides or at least equal to the ratio obtained for the non-deuterated non-modified reference polyribonucleotide with the only two exceptions being polyribonucleotides, wherein 25% of the cytidine and 25% of the uridine residues were deuterated at lower doses, and polyribonucleotides having all uridine residues deuterated at the highest dose. Again, the percentage of deuterated nucleotides negatively correlated with said ratio.

Comparison of Translation Kinetic and hIL-6 Cytokine Induction of Luciferase Encoding Polyribonucleotide Containing N1mψU Vs. deutN1mψU As shown in FIG. 3A, luciferase activity of all polyribonucleotides, wherein different percentages (10%, 25%, 50%, 100%) of uridine residues were replaced by N1mψU (N1mPseudoU) and deuterated N1mψU (d3N1mPseudoU), respectively, was higher than the luciferase activity of a non-deuterated non-modified reference polyribonucleotide for all doses. A positive correlation of luciferase activity and the percentage of replaced uridines was observed and polyribonucleotides with replaced deuterated N1mψU showed a comparable or even higher level of luciferase activity compared to polyribonucleotides with replaced non-deuterated N1mψU. Polyribonucleotide having all four nucleotides deuterated showed a comparable level of luciferase activity as polyribonucleotide with 25% of uridine residues being replaced by deuterated N1mψU and non-deuterated N1mψU, respectively.

As shown in FIG. 3B, hIL-6 cytokine induction by all polyribonucleotides, wherein different percentages (10%, 25%, 50%, 100%) of uridine residues were replaced by N1mψU and deuterated N1mψU, respectively, was less than the hIL-6 cytokine induction by a non-deuterated non-modified reference polyribonucleotide for all doses. A negative correlation of hIL-6 cytokine induction and the percentage of replaced uridines was observed and polyribonucleotides with replaced deuterated N1mψU showed a comparable or even lower level of hIL-6 cytokine induction compared to polyribonucleotides with replaced non-deuterated N1mψU. Polyribonucleotide having all four nucleotides deuterated showed a higher level of hIL-6 cytokine induction as polyribonucleotides with replaced uridine residues.

In FIG. 3C, the ratio of hIL-6 cytokine induction and luciferase activity is shown for the investigated polyribonucleotides vs. dose with low values of said ratio indicating low hIL-6 cytokine induction and/or high luciferase activity. This ratio was smaller for all investigated polyribonucleotides than for the non-deuterated non-modified reference polyribonucleotide. Again, the percentage of deuterated N1mψU negatively correlated with said ratio.

Comparison of Translation Kinetic and hIL-6 Cytokine Induction of Luciferase Encoding Polyribonucleotide Containing m5U Vs. deutm5U As shown in FIG. 4A, luciferase activity of all polyribonucleotides, wherein different percentages (10%, 25%, 50%, 100%) of uridine residues were replaced by m5U and deuterated m5U (d4m₅U), respectively, had lower luciferase activity compared to a non-deuterated non-modified reference polyribonucleotide and a polyribonucleotide, wherein all four nucleotides were deuterated, for all doses.

As shown in FIG. 4B, hIL-6 cytokine induction by polyribonucleotides, wherein different percentages (10%, 25%, 50%, 100%) of uridine residues were replaced by m₅U and deuterated m₅U, respectively, was less than the hIL-6 cytokine induction by a non-deuterated non-modified reference polyribonucleotide in case of 25% and 50% m₅U as well as 25% and 50% of deuterated m₅U and high doses of 100% deuterated m₅U. Polyribonucleotide, wherein all four nucleotide types were deuterated, was superior to all remaining polyribonucleotides.

In FIG. 4C, the ratio of hIL-6 cytokine induction and luciferase activity is shown for the investigated polyribonucleotides vs. dose with low values of said ratio indicating low hIL-6 cytokine induction and/or high luciferase activity. The non-deuterated non-modified reference polyribonucleotide and the polyribonucleotide, wherein all four nucleotide types were deuterated, were equal to or as in most cases superior to all remaining polyribonucleotides, especially at higher doses.

Analysis of Double-Stranded Polyribonucleotide Structures by Dot Blot

Dot blot analysis was done to detect double stranded polyribonucleotide structures of the test and reference polyribonucleotides. In short, polyribonucleotide was serially diluted starting from 1 µg to 7.8 ng in WFI. As positive control, HMW Poly(I:C) was serially diluted starting from 1 µg to 0.06 ng in WFI. Diluted test and reference polyribonucleotide samples and control were spotted onto a Nytran SuPerCharge blotting membrane. Membrane was dried for 30 min at RT, blocked with 5% non-fat dried milk in TBS T buffer (1×TBS, 0.05% Tween 20, pH7) for 1 h at RT and incubated with the 1st dsRNA specific monoclonal antibody J2 (1:2,000) o/n at 4° C. Membrane was washed 3 times with TBS T buffer and incubated with the 2nd goat anti mouse HRP conjugated antibody (1:10,000) for 1 h at RT. Further, membrane was washed 3 times with TBS T buffer and detected by the chemiluminescent kit "SuperSignal™ West Femto Maximum Sensitivity Substrate" for 5 min at RT. Images were captured using a ChemiDoc XRS+ system (Bio-Rad, 10 images, 20 sec).

Dot blot analysis of luciferase encoding polyribonucleotide containing non-deuterated and deuterated nucleotides is shown in FIG. 5. None or very low levels of double-stranded polyribonucleotide was observed except in case of the non-deuterated non-modified reference polyribonucleotide, polyribonucleotide, wherein 25% of cytidine-5'-triphosphat and 25% of uridine residues were deuterated. Two other exceptions were highly concentrated polyribonucleotide (1000 ng), wherein 25% of adenosine-5'-triphosphat and 25% of guanosine-5'-triphosphat residues were deuterated, and highly concentrated polyribonucleotide (500 ng), wherein all uridine residues were deuterated.

Dot blot analysis of luciferase encoding polyribonucleotide containing N1mψU and deuterated N1mψU, and m₅U and deuterated m₅U, respectively, is shown in FIG. 6. Double stranded polyribonucleotide was detected at low levels, except in case of 50% and 100% of m₅U.

Analysis of Fully Deuterated Modified mRNA Molecules Containing m₅U/I₅C by Using Different Target Proteins on Transgene Expression and hIL-6 Response Production of Test and Reference Items For the experiments described in the following test and reference items shown in Table 16 were investigated (listed are only percentages of deuterated and modified nucleotides). Test and reference items were produced using co-transcriptional capping (ARCA) and either linearized d2EGFP and poly(A) encoding templates or linearized luciferase and poly(A) encoding templates in to a standard T7 in vitro transcription reaction. Polyribonucleotides were precipitated two times with NH₄OAc, dissolved either in deuterium oxide (all polyribonucleotides containing deuterated nucleosides) or in WFI (all polyribonucleotides containing no deuterated nucleosides) and stored at 80° C.

TABLE 16

| Test Items: luciferase encoding polyribonucleotides | Conc. [mg/mL] |
|---|---|
| 15% m₅U, 3% I₅C | 1 |
| 15% m₅U, 85% deutU, 3% I₅C, 97% deutC, 100% deutA/G | 1 |

| Test Items: d2EGFP encoding polyribonucleotides | Conc. [mg/mL] |
|---|---|
| 15% m₅U, 3% I₅C | 1 |
| 15% m₅U, 85% deutU, 3% I₅C, 97% deutC, 100% deutA/G | 1 |

| Carrier | | |
|---|---|---|
| Lipofectamine ™ MessengerMAX ™ | | |
| Test System | Species | Strain |
| Cell line | Human | A549 (lung adenocarcinoma epithelial cell line) |
| Thawed passage no. | Working passage no. | Supplier |
| p4 | p6 | DSMZ; ACC 107 |

Polyribonucleotide Analysis by Fragment Analyzer (FA)

All test and reference items shown in Table 16 were analyzed in terms of size and smear by FA. 2 μL (c(polyribonucleotides)=0.05 mg/mL) of test or reference polyribonucleotides were analyzed in 24 μL final volume of kit specific sample dilution buffer under denaturation conditions. Further sample preparation and running conditions were performed according to the instructor's manual "Standard Sensitivity RNA Analysis Kit (15 nt)—User Guide".

Cell Seeding and Transfection

For transfection, 20,000 A549 cells per well were seeded in a 96-well plate. 24 h post seeding, transfection of A549 cells using Lipofectamine™ MessengerMAX™ transfection reagent were done. The polyribonucleotide amounts of 125 ng/62.5 ng/31.25 ng/well were tested in triplicates for each test and reference polyribonucleotide shown in Table 16.

For kinetic analysis, d2EGFP was measured at time points of 24 h, 48 h, 72 h and 144 h and the luciferase activity was measured at 6 h, 24 h, 48 h and 72 h post transfection.

Luciferase Activity Measurement Using Luminescence Infinity Plate Reader

For luminescence measurement detecting luciferase activity, fresh lysates were measured 6 h, 24 h, 48 h and 72 h post transfection of all luciferase encoding polyribonucleotides using luciferase assay buffer. For each time point, cells were washed one time with 200 μL PBS w/o Mg²⁺/Ca²⁺ and lysed with 100 μL 1× lysis buffer for 20 min at RT and 300 rpm. 10 μL 1:10 diluted cell lysate in lysis buffer were transferred to a 96-well white flat bottom polystyrene plate and luciferase activity was measured at the Tecan Infinite M200 PRO Microplate Reader device using 100 μL luciferase assay buffer. The temperature was kept constant for all time points during luciferase measurement. The absolute values were detected.

FIG. 7 shows results obtained for the comparison of luciferase activity in A549 cells at different time points after transfection with luciferase encoding polyribonucleotides containing either modified or modified and deuterated nucleotides. Luciferase activity was higher for luciferase encoding polyribonucleotides containing modified and deuterated nucleotides than for luciferase encoding polyribonucleotides containing modified nucleotides at different time points (6 h, 24 h, 48 h, and 72 h after transfection, respectively). Further, luciferase activity was higher for luciferase encoding polyribonucleotides containing modified and deuterated nucleotides than for luciferase encoding polyribonucleotides containing modified nucleotides in case of all different polyribonucleotide amounts used for transfection (125 ng/well, 62.5 ng/well, and 31.25 ng/well, respectively). Thus, transfection of polyribonucleotides containing modified and deuterated nucleotides resulted in an enhanced expression of the encoded protein compared to transfection of polyribonucleotides comprising the same sequence but without said deuterated nucleotides.

Human IL-6 (hIL-6) Cytokine Measurement from A549 Supernatants

Human IL-6 cytokine measurement was done in A549 cell supernatants at 24 h post transfection of the luciferase encoding polyribonucleotides (c.f. Table 16) by ELISA using the Quantikine ELISA Human IL-6 kit (R&D systems) according to the instructor's manual. Cell supernatants transfected with 125 ng/62.5 ng/31.25 ng polyribonucleotides were pipetted in a new polypropylene round bottom plate and stored at −80° C. Before measurement, all cell supernatants were centrifuged at 4° C. with ~4000× and supernatants of cells transfected with 125 ng/well polyribonucleotide were diluted 1:10 in serum-free MEM medium. The absorbance at 450/540 nm was measured using a Wallac Victor2 1420 Multilabel reader. The absolute values were detected.

As shown in FIG. 8, the hIL-6 response was lower in case of all amounts of luciferase encoding polyribonucleotides investigated 24 h after transfection for polyribonucleotides containing modified and deuterated nucleotides. Thus it could be shown that the transfection of the cells using polyribonucleotides containing modified and deuterated nucleotides resulted in reduced immunogenicity compared to the transfection with polyribonucleotides comprising the same sequence but without deuterated nucleotides.

Hence, it was shown that the transfection of cells with polyribonucleotides containing modified and deuterated nucleotides resulted in an enhanced expression of the encoded protein and a reduced immunogenicity compared to the transfection with polyribonucleotides comprising the same sequence but without deuterated nucleotides.

d2EGFP Measurement Using Fluorescence Infinity Plate Reader

For fluorescence measurement detecting d2EGFP, fresh lysates were measured 24 h, 48 h, 72 h and 144 h post transfection of all d2EGFP polyribonucleotides. For each time point, cells were washed one time with 200 μL PBS w/o Mg²⁺/Ca²⁺ and lysed with 100 μL 1× lysis buffer for 20 min at RT and 300 rpm. 10 μL 1:10 diluted cell lysate in lysis buffer were transferred to a 96-well white flat bottom polystyrene plate and d2EGFP fluorescence was measured at the Tecan Infinite M200 PRO Microplate Reader device. The temperature was kept constant for all time points during measurement. The absolute values were detected.

As shown in FIG. 9, d2EGFP fluorescence was higher for d2EGFP encoding polyribonucleotides containing modified and deuterated nucleotides than for d2EGFP encoding polyribonucleotides containing modified nucleotides at different time points (24 h, 48 h, 72 h, and 144 h after transfection). Further, d2EGFP fluorescence was higher for d2EGFP encoding polyribonucleotides containing modified and deuterated nucleotides than for d2EGFP encoding polyribonucleotides containing modified nucleotides in case of all different polyribonucleotide amounts used for transfection (125 ng/well, 62.5 ng/well, and 31.25 ng/well). Thus, as in the experiment shown above, transfection of polyribonucleotides containing modified and deuterated nucleotides resulted in an enhanced expression of the encoded protein compared to transfection of polyribonucleotides comprising the same sequence but without said deuterated nucleotides.

The invention claimed is:

1. An isolated polyribonucleotide comprising a sequence which encodes a protein, wherein at least 25% of each type of nucleotide selected from the group consisting of adenosine, cytidine, guanosine, and uridine is deuterated, wherein the expression of said polyribonucleotide is enhanced compared to a polyribonucleotide comprising the same sequence but without said deuterated nucleotides.

2. The isolated polyribonucleotide according to claim 1, wherein 25% to 50% of the adenosine, cytidine, guanosine, and uridine residues are deuterated.

3. The isolated polyribonucleotide according to claim 1, wherein 50% to 75% of the adenosine, cytidine, guanosine, and uridine residues are deuterated.

4. The isolated polyribonucleotide according to claim 1, wherein 75% to 100% of the adenosine, cytidine, guanosine, and uridine residues are deuterated.

5. The isolated polyribonucleotide according to claim 1, wherein the polyribonucleotide further comprises one or more types of modified nucleotides.

6. The isolated polyribonucleotide of claim 5, wherein said modified nucleotides are fully or partially deuterated.

7. A pharmaceutical composition containing the isolated polyribonucleotide according to claim 1 together with a pharmaceutically acceptable carrier.

8. A method for preparing a polyribonucleotide comprising a sequence which encodes a protein, comprising using deuterated adenosine, cytidine, guanosine, and uridine nucleotides and modified forms thereof for the preparation of said polyribonucleotide, wherein said polyribonucleotide shows reduced immunogenicity and/or enhanced expression compared to a polyribonucleotide comprising the same sequence but without said deuterated nucleotides, wherein at least 25% of each adenosine, cytidine, guanosine, and uridine nucleotides are deuterated in the polyribonucleotide.

9. A method for reducing the immunogenicity and/or enhancing the expression of a polyribonucleotide comprising a sequence which encodes a protein, comprising: incorporating deuterated adenosine, cytidine, guanosine, and/or uridine residues within said polyribonucleotide, wherein said polyribonucleotide thus obtained displays reduced immunogenicity and/or enhanced expression compared to a polyribonucleotide comprising the same sequence but without said deuterated nucleotides, wherein at least 25% of each adenosine, cytidine, guanosine, and uridine nucleotides are deuterated in the polyribonucleotide.

10. The isolated polyribonucleotide of claim 1, wherein immunogenicity of said polyribonucleotide is reduced compared to a polyribonucleotide comprising the same sequence but without said deuterated nucleotides.

11. An isolated polyribonucleotide comprising a sequence which encodes a protein, wherein at least 25% of at least two types of nucleotides selected from the group consisting of adenosine, cytidine, guanosine, and uridine are deuterated, wherein the expression of said polyribonucleotide is enhanced compared to a polyribonucleotide comprising the same sequence but without said deuterated nucleotides.

12. The isolated polyribonucleotide according to claim 11, wherein 25% to 50% of at least two of the adenosine, cytidine, guanosine, and uridine residues are deuterated.

13. The isolated polyribonucleotide according to claim 11, wherein 50% to 75% of at least two of the adenosine, cytidine, guanosine, and uridine residues are deuterated.

14. The isolated polyribonucleotide according to claim 11, wherein 75% to 100% of at least two of the adenosine, cytidine, guanosine, and uridine residues are deuterated.

15. The isolated polyribonucleotide according to claim 11, wherein the polyribonucleotide further comprises one or more types of modified nucleotides.

16. The isolated polyribonucleotide of claim 15, wherein said modified nucleotides are fully or partially deuterated.

* * * * *